March 15, 1932.                P. R. FORMAN                1,849,516
                            DOOR CONTROL SYSTEM
                           Filed Oct. 22, 1930        23 Sheets-Sheet 11

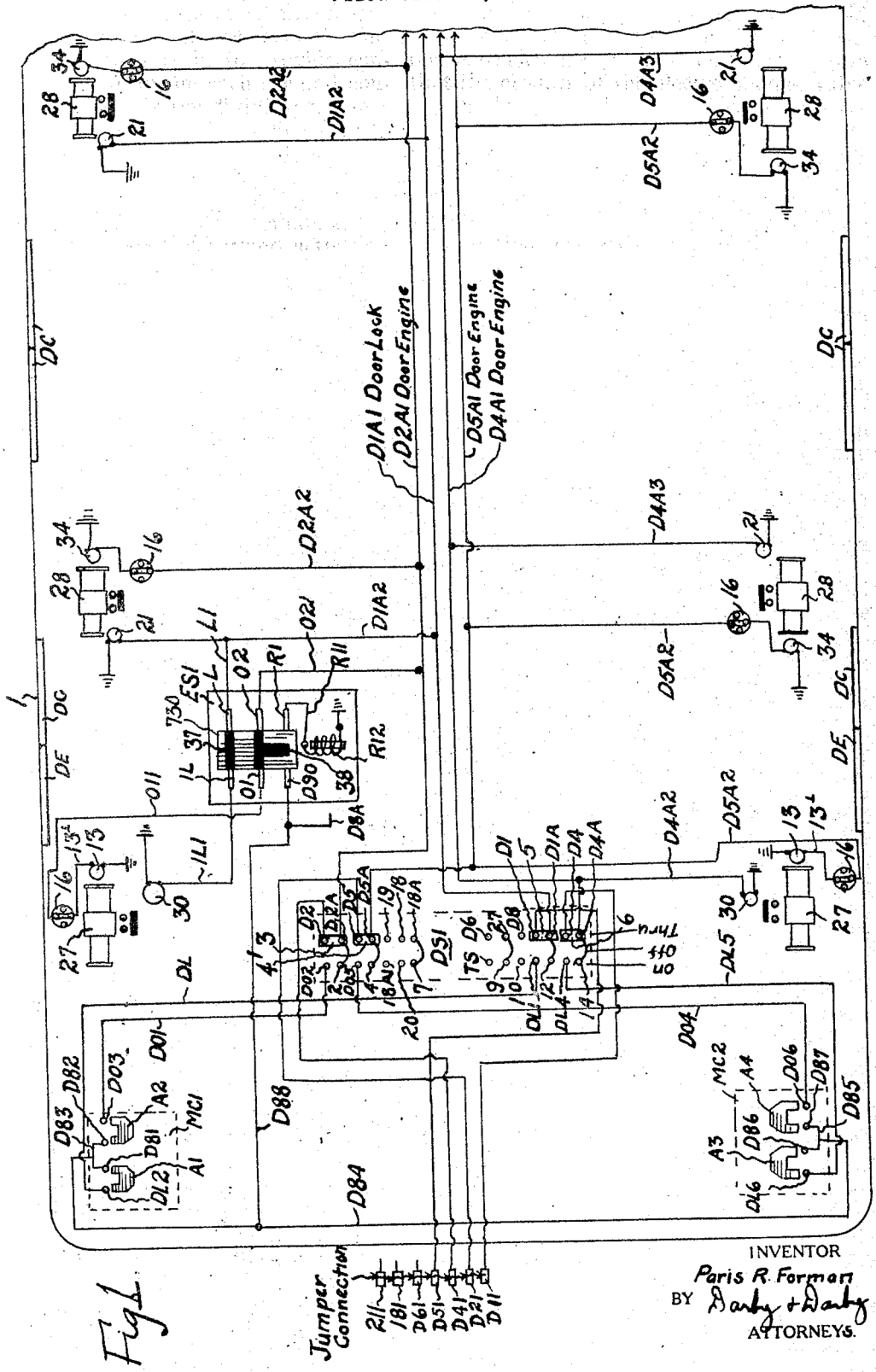

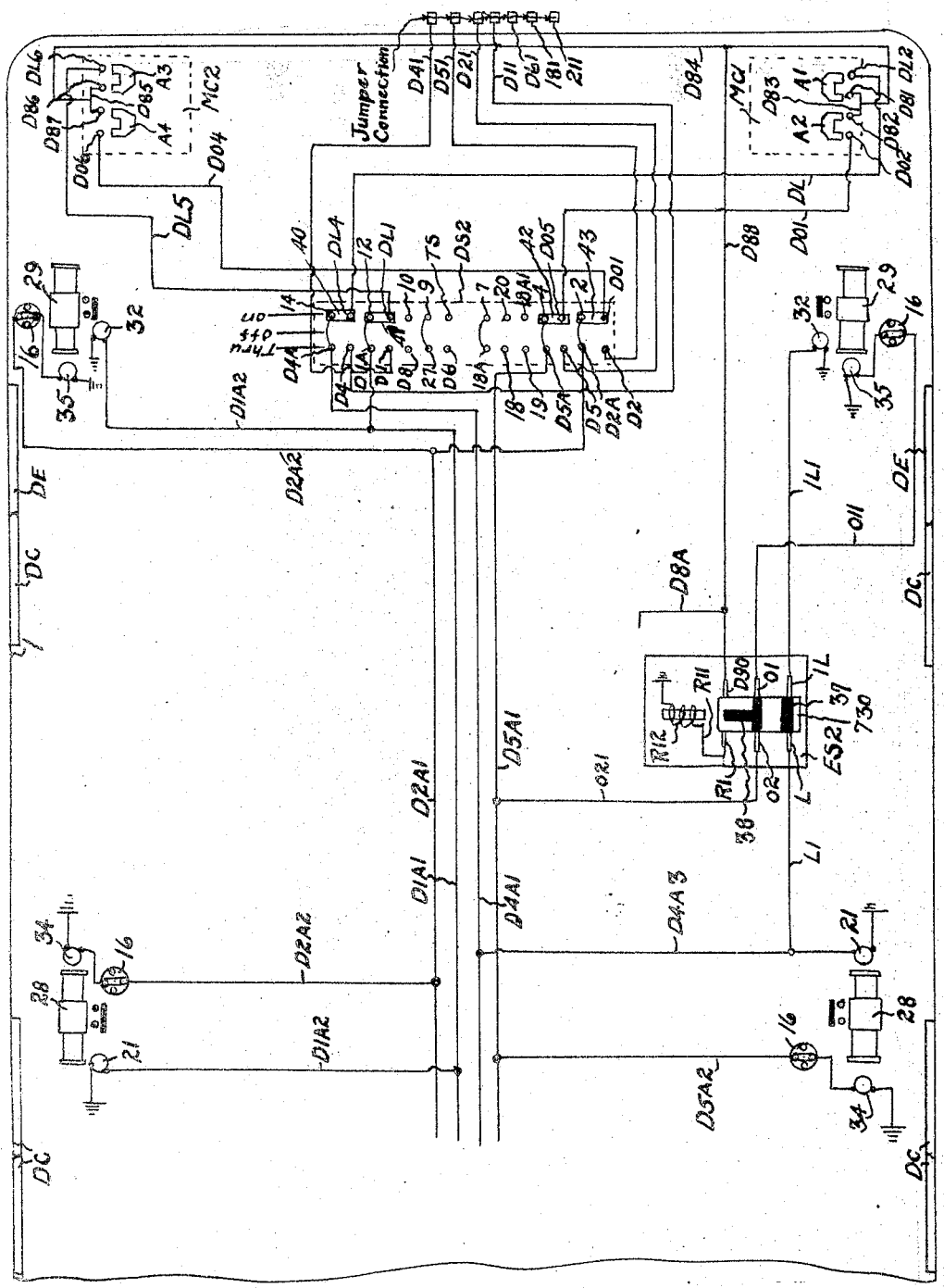

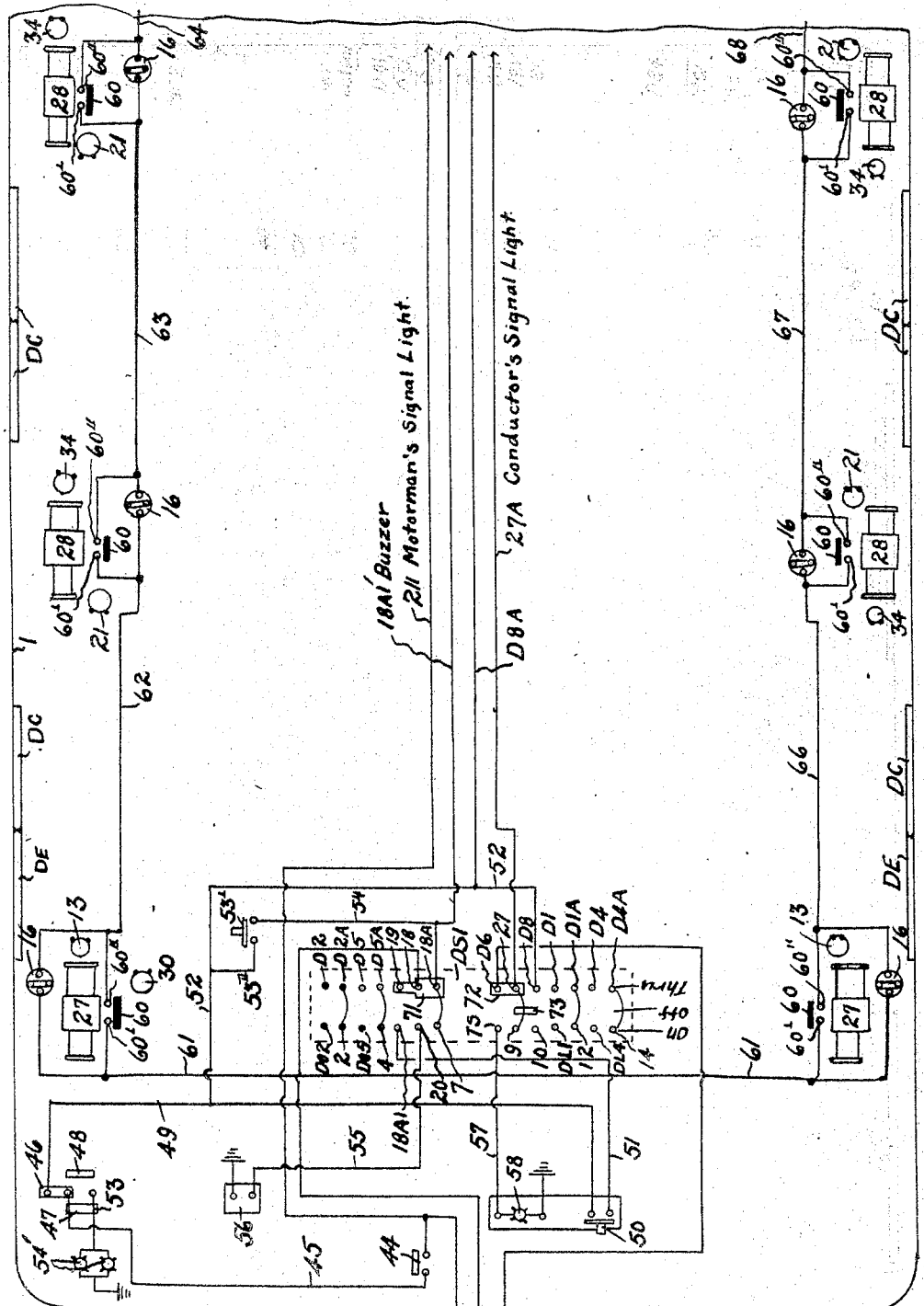

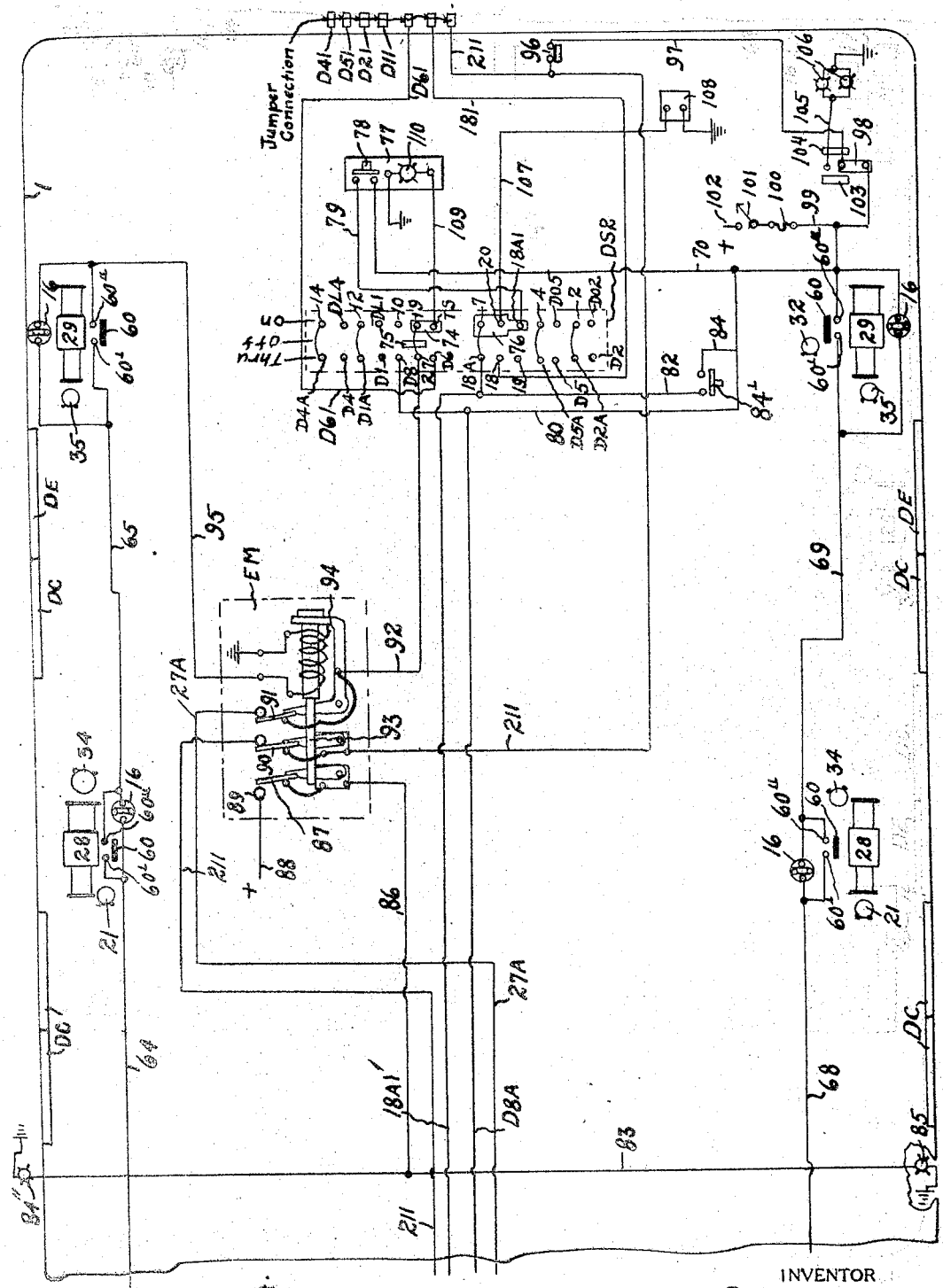

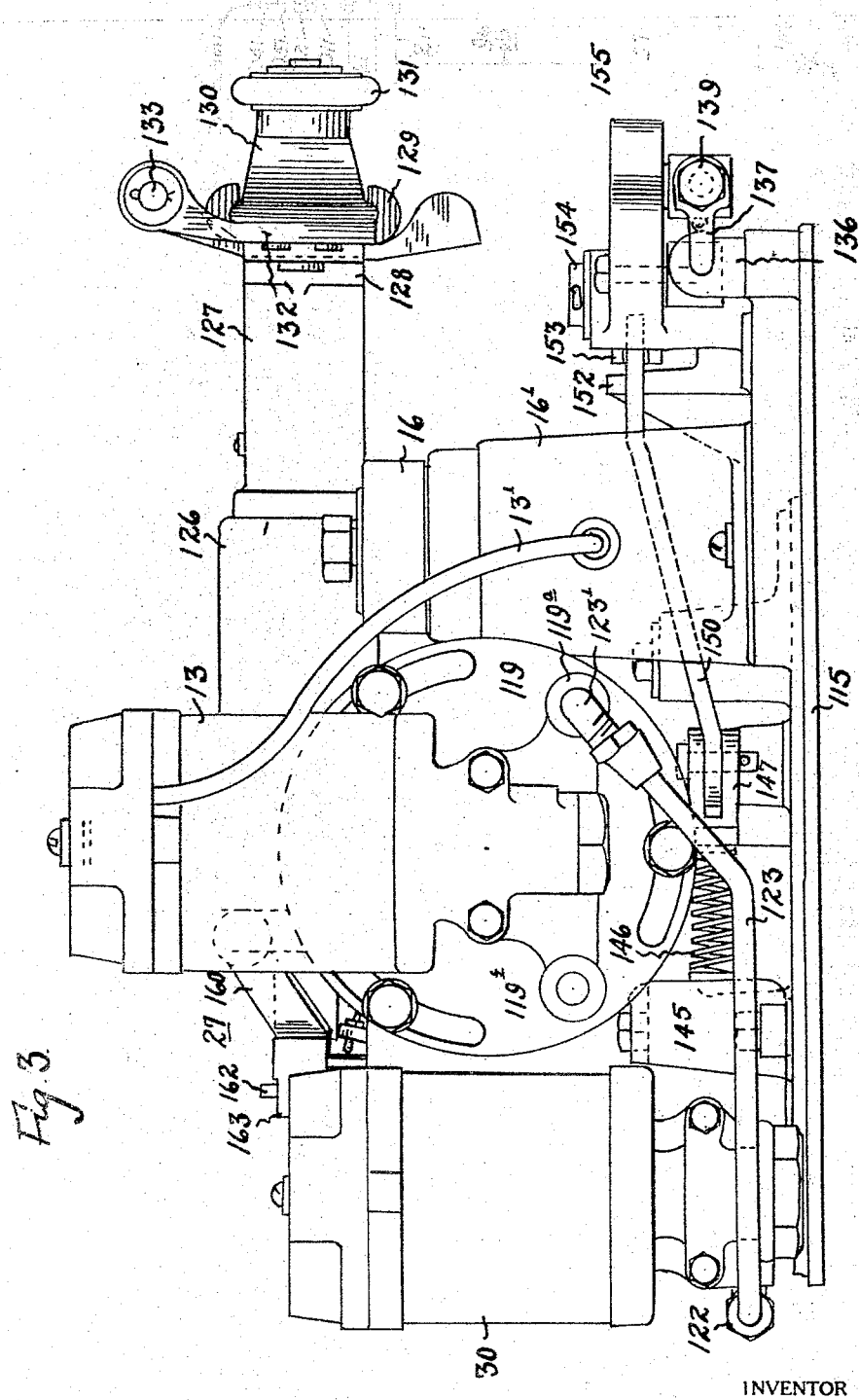

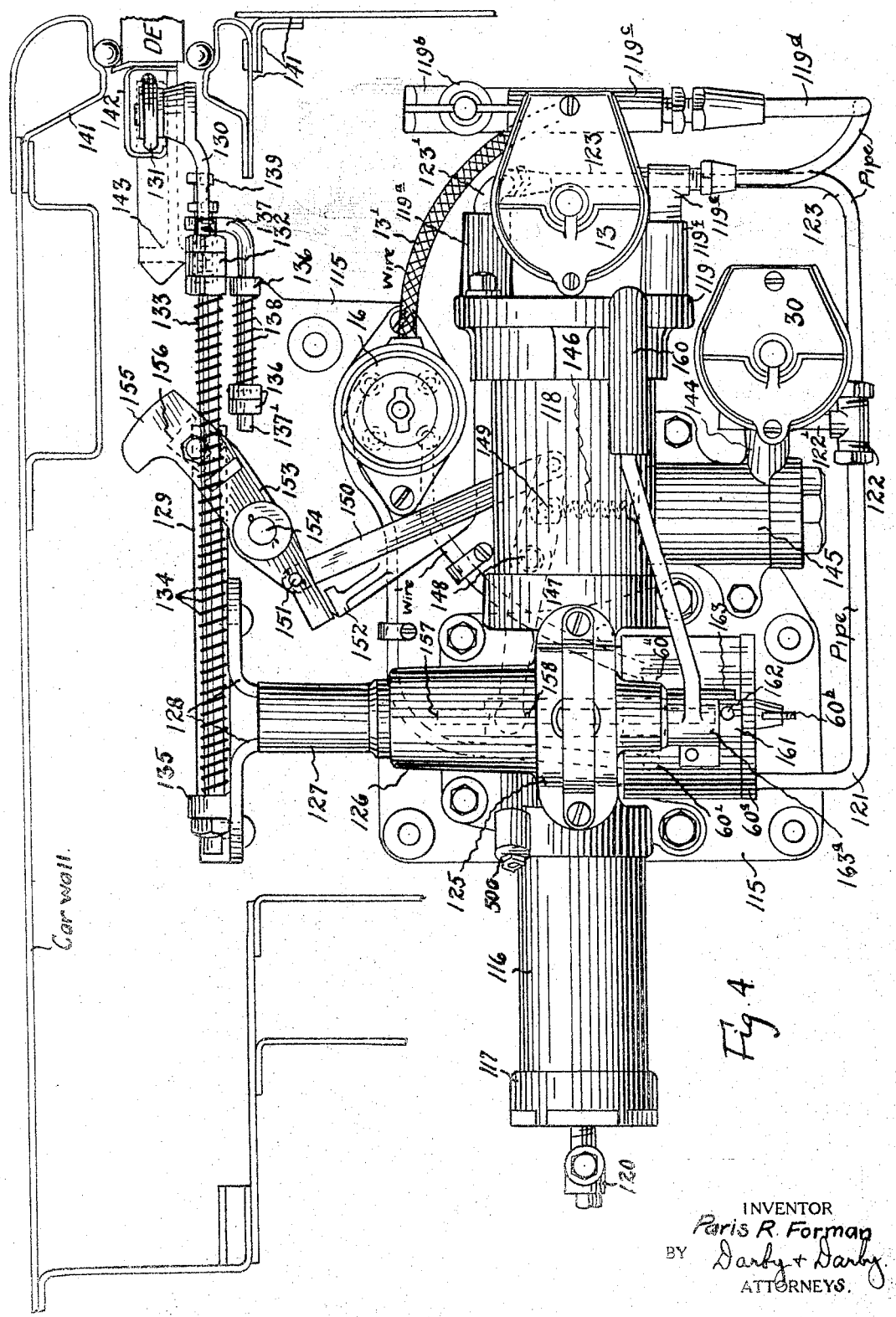

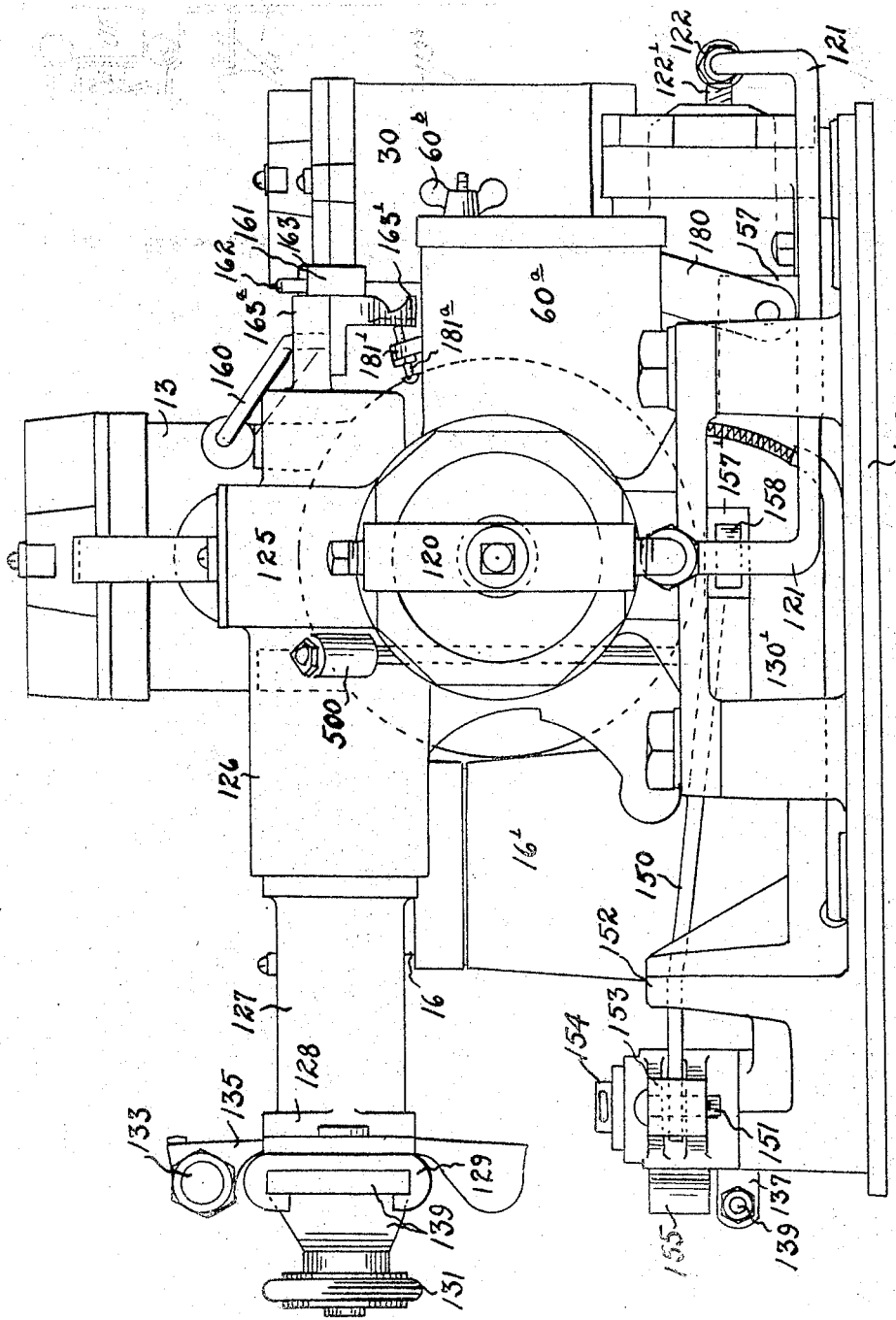

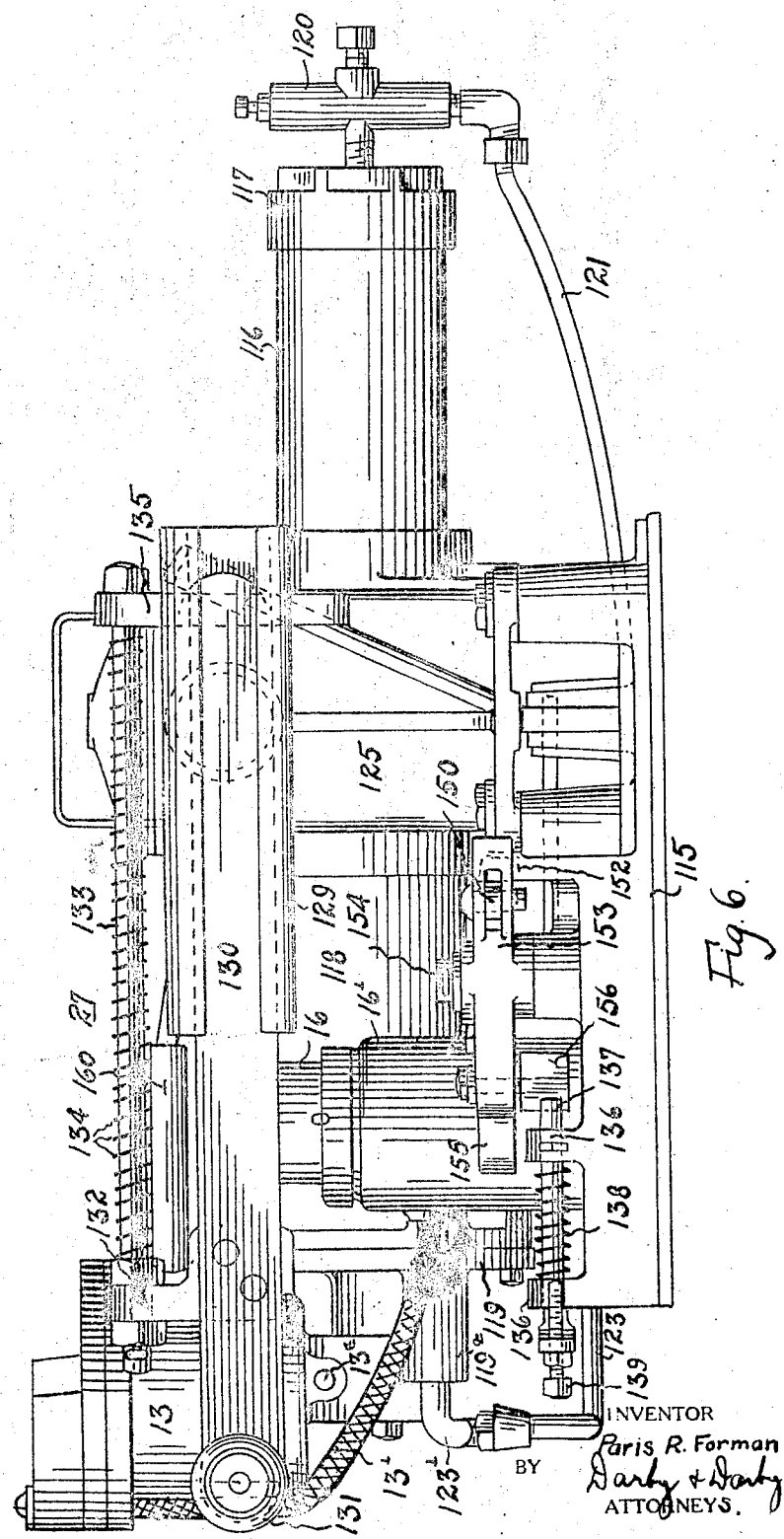

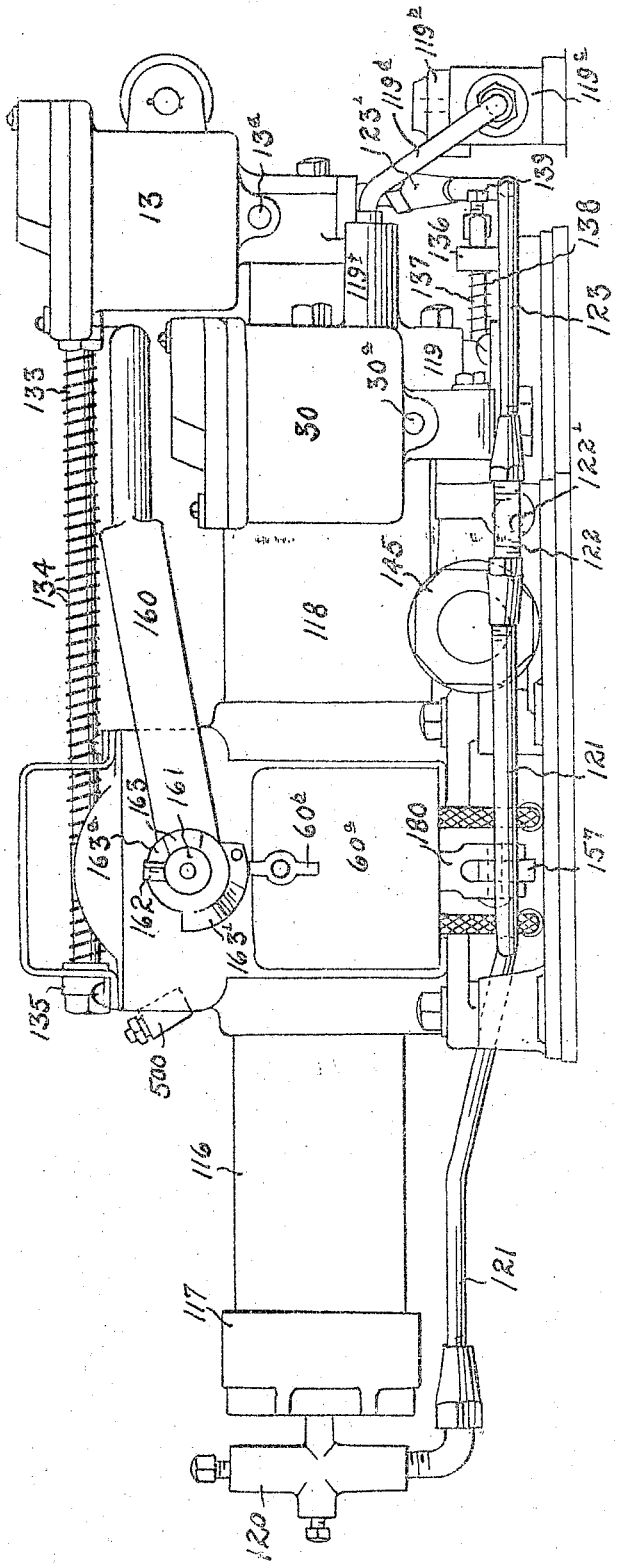

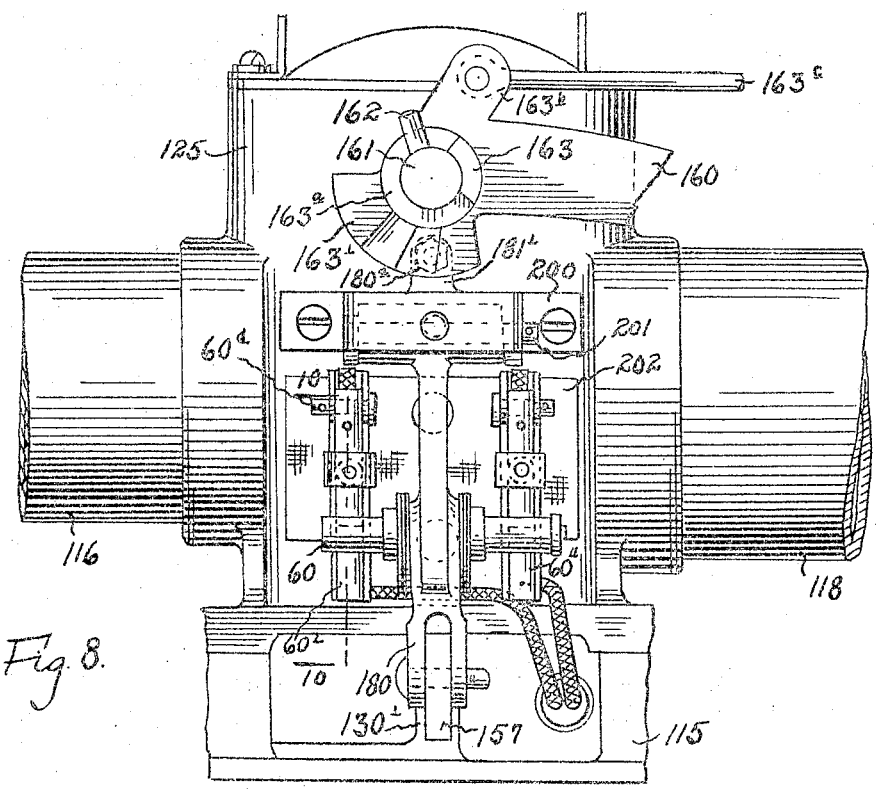
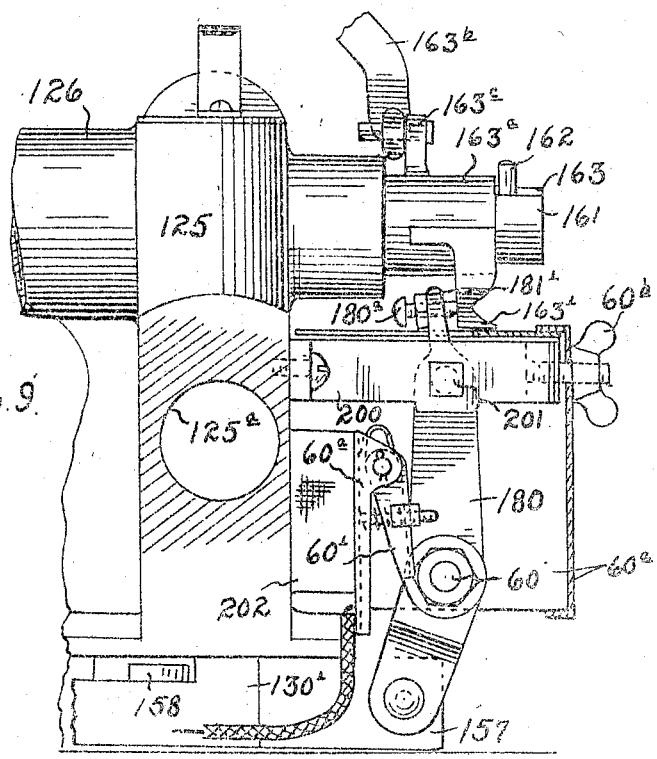
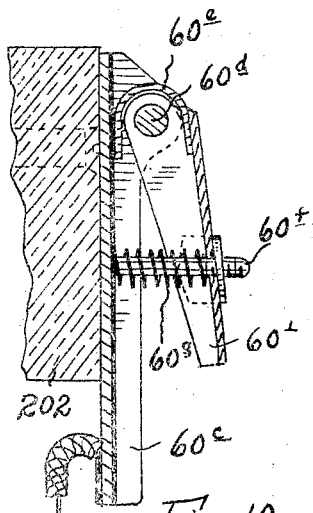

INVENTOR
Paris R. Forman
BY Darby + Darby
ATTORNEYS.

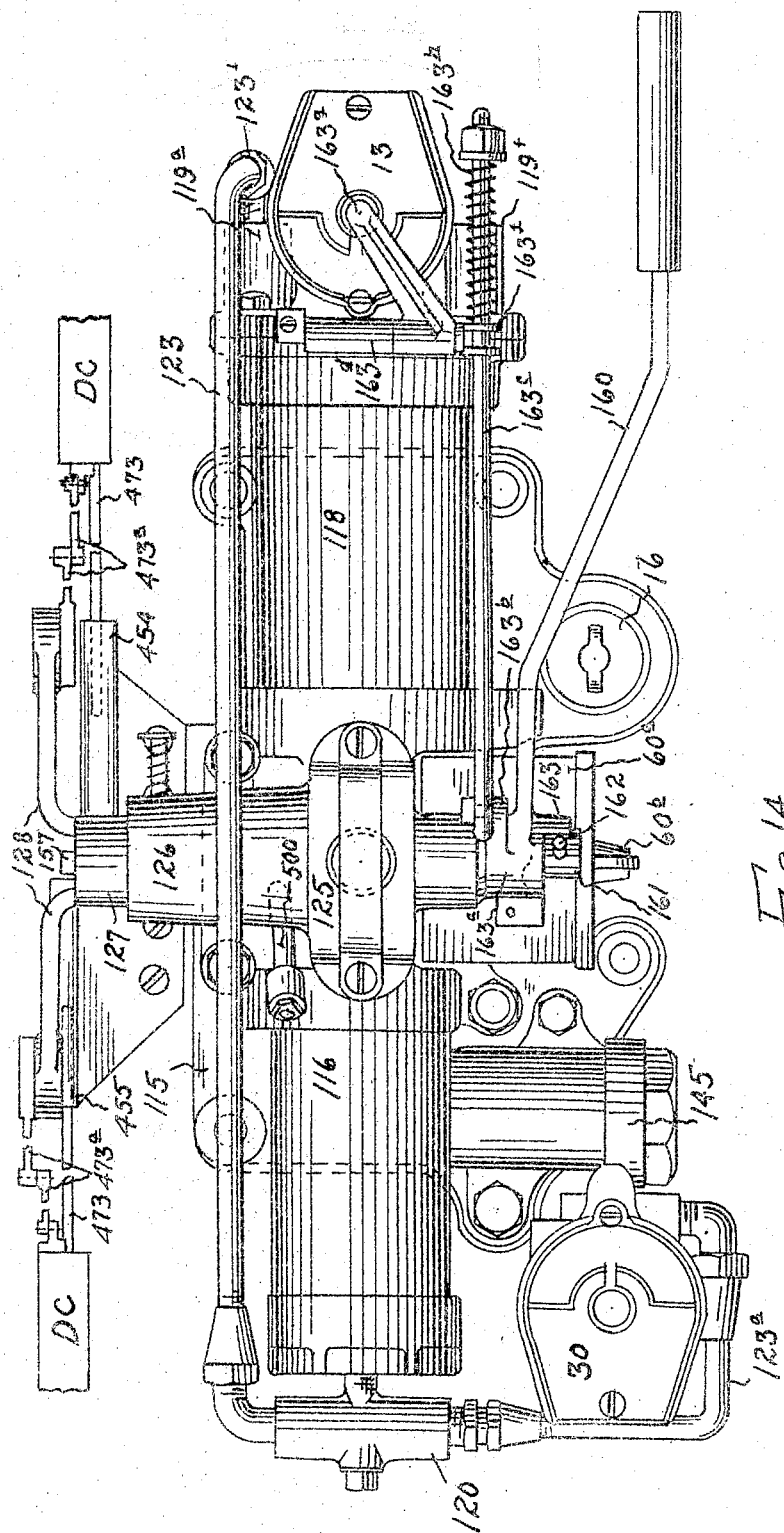

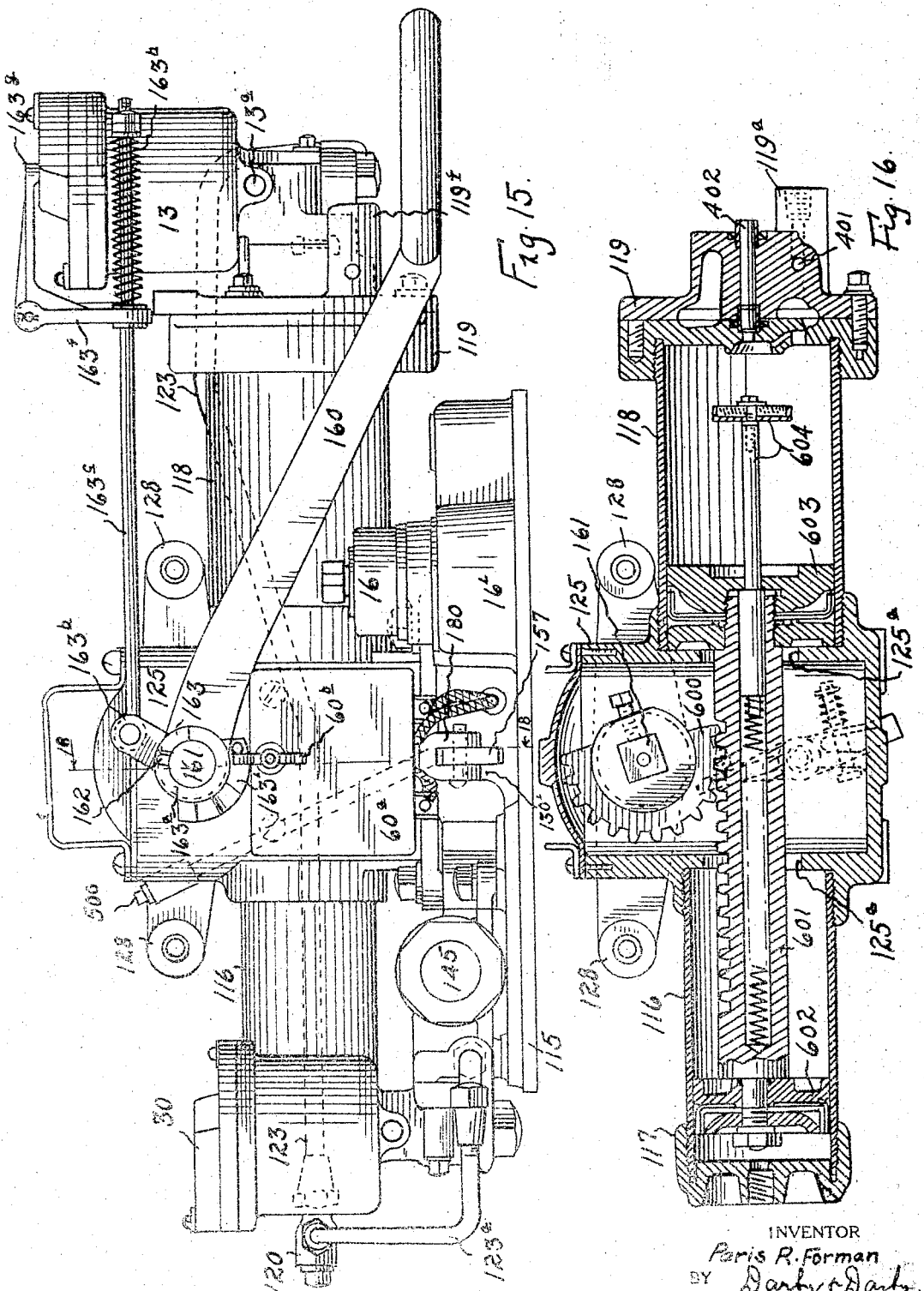

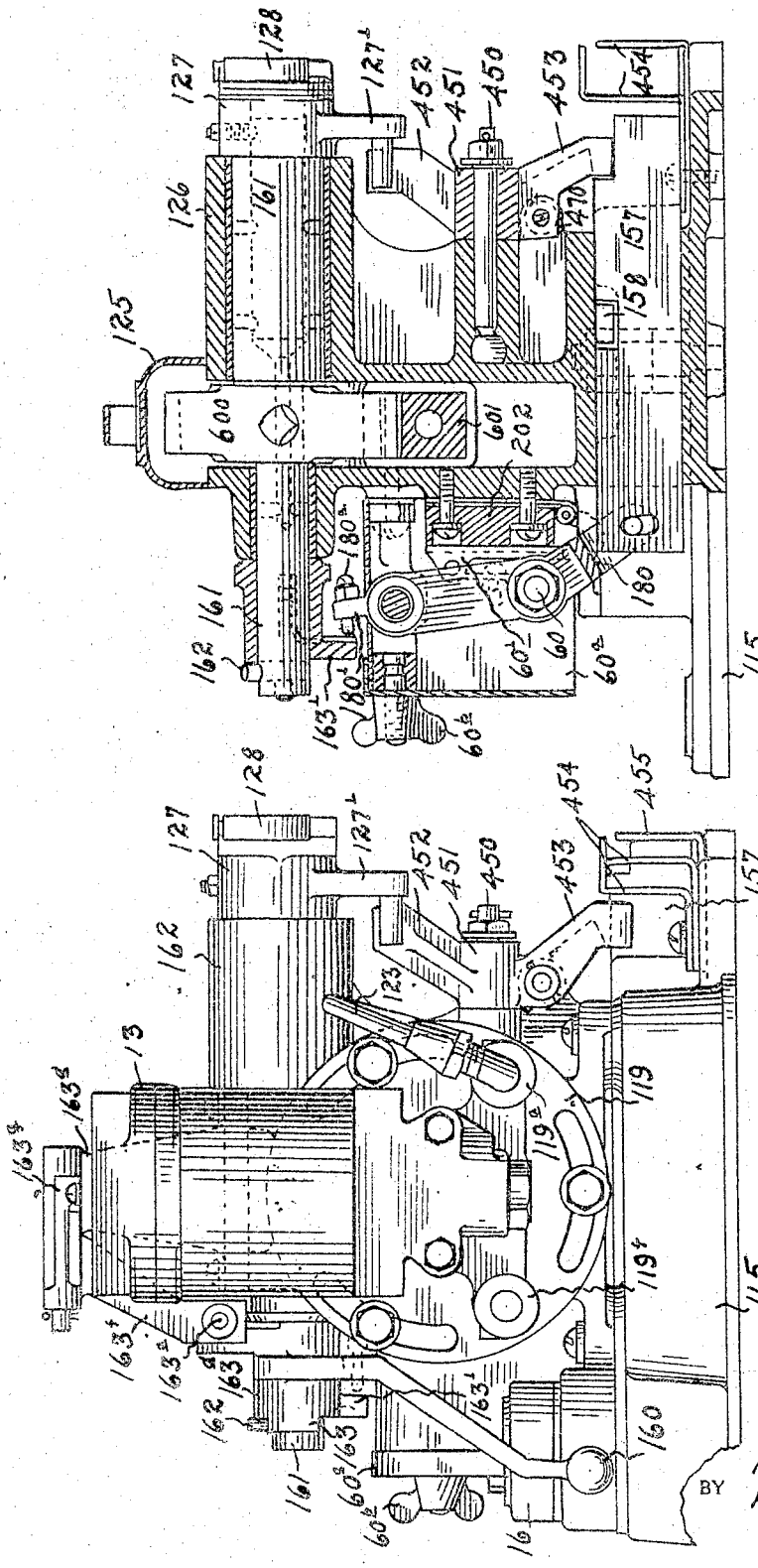

March 15, 1932. P. R. FORMAN 1,849,516
DOOR CONTROL SYSTEM
Filed Oct. 22, 1930 23 Sheets-Sheet 16

Inventor
Paris R. Forman
By his Attorneys. Darby & Darby

March 15, 1932.   P. R. FORMAN   1,849,516
DOOR CONTROL SYSTEM
Filed Oct. 22, 1930   23 Sheets-Sheet 17

Inventor
Paris R. Forman
By his Attorneys, Darby & Darby

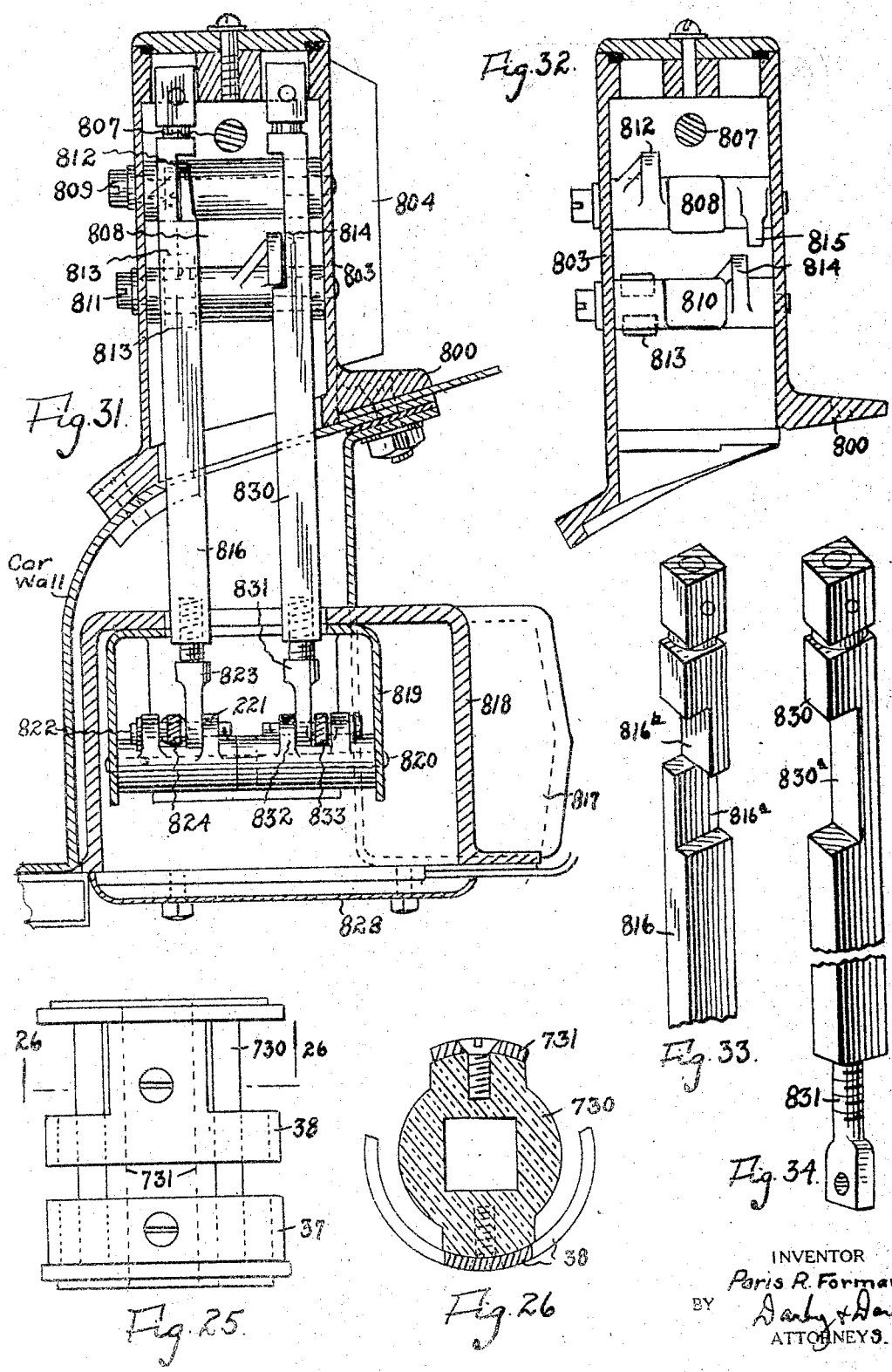

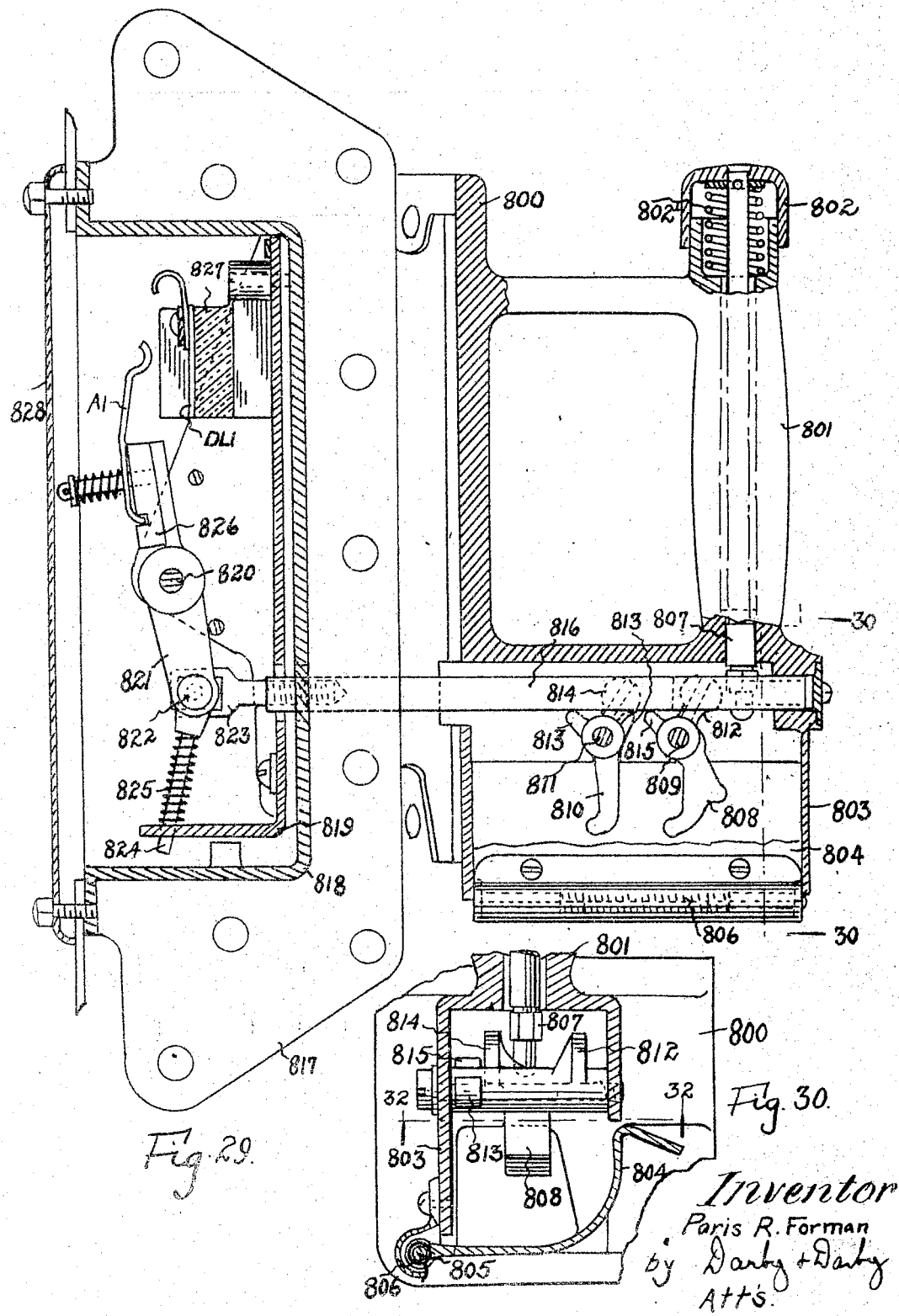

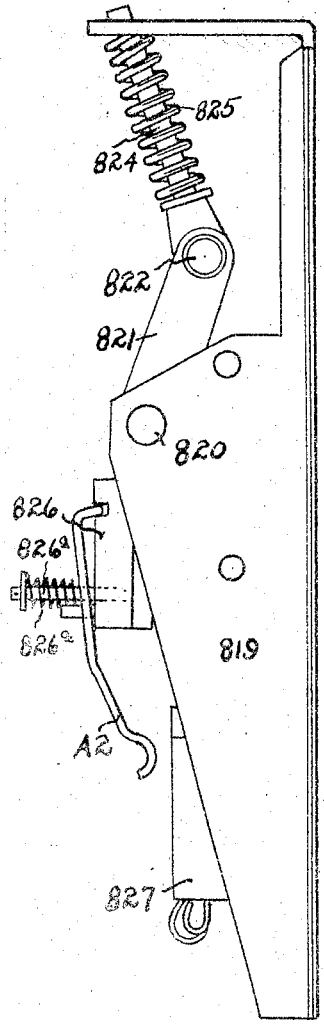
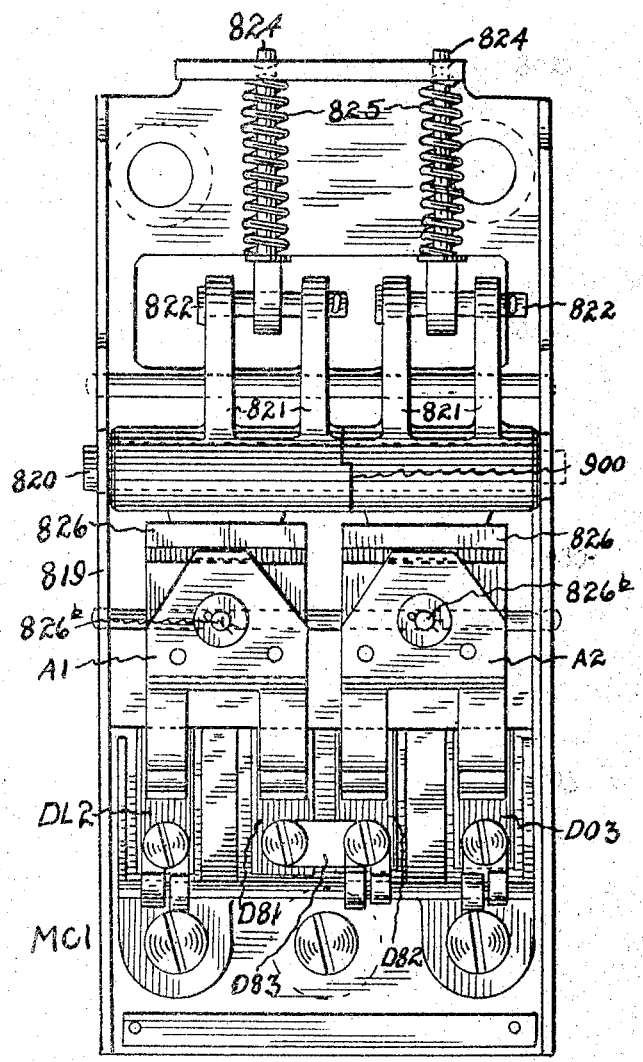
Fig. 35.
Fig. 36.

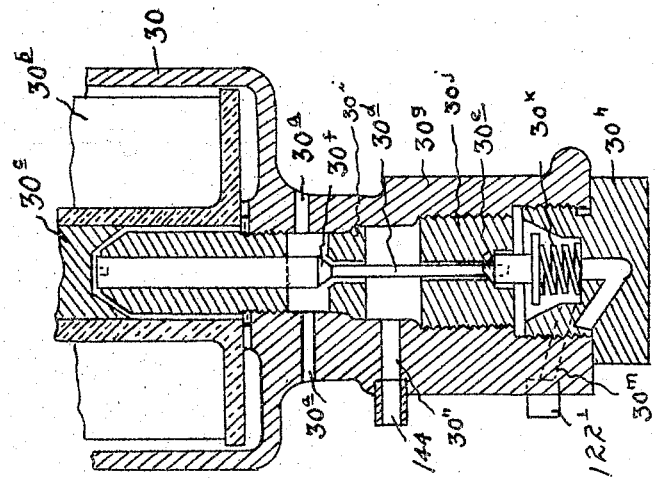
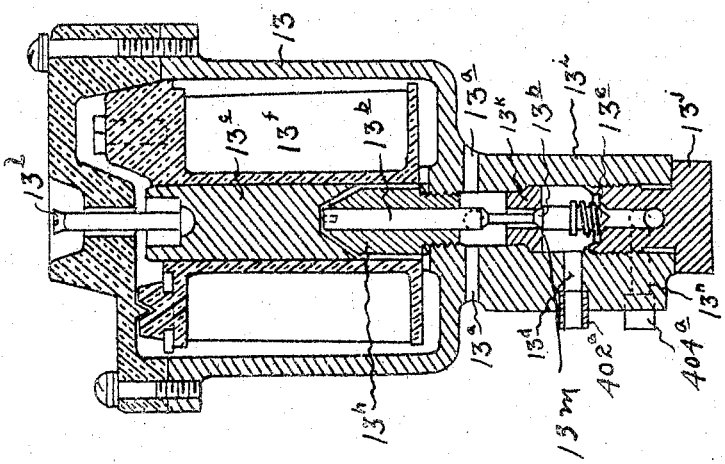

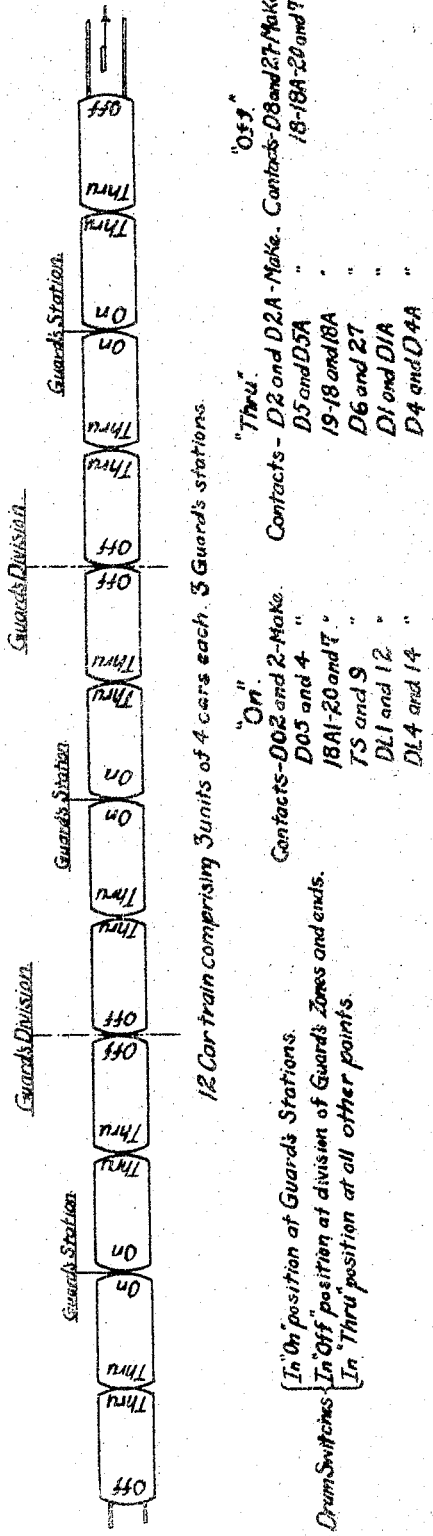
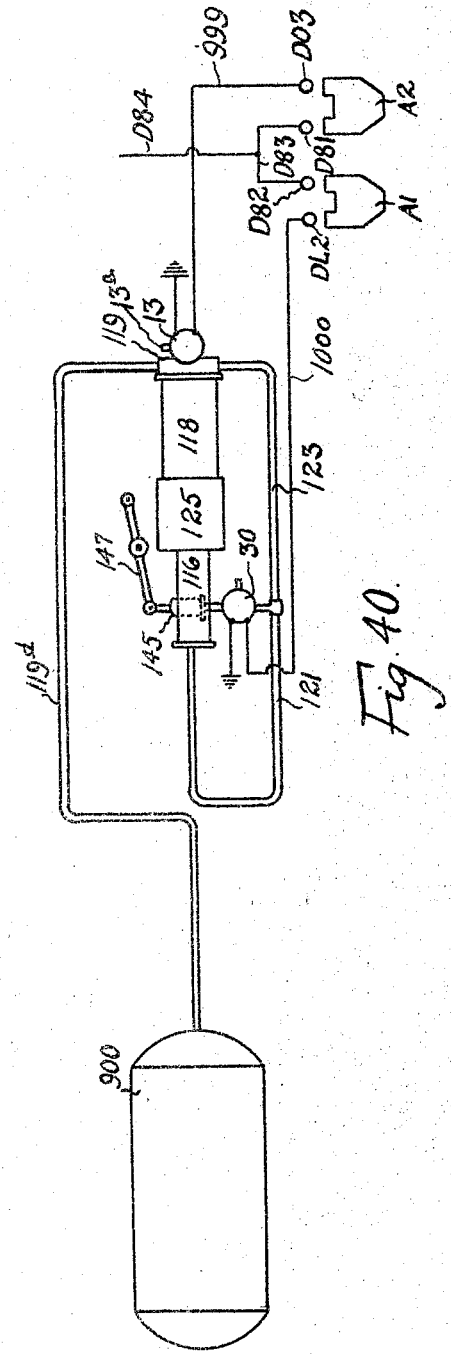

UNITED STATES PATENT OFFICE

PARIS R. FORMAN, OF RAHWAY, NEW JERSEY, ASSIGNOR TO NATIONAL PNEUMATIC COMPANY, OF NEW YORK, N. Y., A CORPORATION OF WEST VIRGINIA

DOOR CONTROL SYSTEM

Application filed October 22, 1930. Serial No. 490,459.

This invention relates to improvements in a door, door lock, and door condition signalling system for vehicles.

One of the objects of this invention is the provision of apparatus for operating a plurality of doors on a vehicle, locks for the doors and signalling devices for indicating at one or a plurality of points the condition of the doors, i. e., whether they are open or closed and locked.

A further object of this invention is the provision of control and operating circuits for the above apparatus.

A further object of this invention is the provision of control and operating circuits on a vehicle so arranged that a train comprising any number of such vehicles may be made up.

A further object of this invention is the provision of switches in the circuits on each car so that a train comprising any number of cars may be quickly divided up as to circuits into any number of desired units comprising any number of cars.

A further object of this invention is the provision of switches and circuits of this type operable so that they may be set to predetermine the guard's station, i. e., the point in each unit of the train from which a guard may control all of the doors on either side of that unit, as well as the locks and signalling circuits.

A further object of this invention is the provision of apparatus and circuits, as described, for operating at least one of the doors or pair of doors on either side of the vehicle in an emergency by a passenger on the vehicle independently of all the other control devices.

A further object of this invention is the provision of means for resetting the emergency apparatus from the guard's station after it has been operated in an emergency.

A further object of this invention is the provision of interconnected control means for the power devices for operating the doors and the locking devices, so that the locks must be released first and then the motors may be operated and both the door control and lock control means are operated simultaneously for closing the doors and locking them.

A further object of the invention is the provision of a signalling system partially controlled by the motive devices so that the proceed signal cannot be given until the doors are not only closed but locked.

A further object of this invention is the provision of connections between the motive devices and the doors to permit the doors to yield during closing so that if they strike an obstruction they will stop, even though the motor continues to urge the doors to closed position.

A further object of this feature is to provide connections so that if a person is caught in the doors, the doors will yield to permit his release, even though the motors continue to urge them to closed position.

A further object of this invention is the provision of manually actuable means forming part of the motive devices for opening the doors sufficiently so that pressure applied directly to the doors will cause them to open all the way.

Another object of this invention is the provision on some of the motive devices of manually actuable means for operating those motive devices independently of the normal controls therefor to open the doors, especially in an emergency.

A further object of the invention involves mechanism forming part of these actuable manual means for first unlocking the doors before they are opened, either manually or by means of the motive devices.

A more specific object of this invention is the provision of apparatus of this type for vehicles having four doors on a side, each door comprising two oppositely movable sections.

A further object is to provide end engines for the last door section at each end of the car on each side for operating that section.

Another object of this invention is the provision for a vehicle of this type of center engines for operating all the remaining sections of the doors, there being three center engines, each of which operates two sections, that is, the adjacent sections of the adjacent doors.

A further object of this invention is the provision of end and center engines of a particular construction for accomplishing these purposes, and including locking mechanism.

A further object of this invention is the provision of switches operated by the engines for controlling signalling circuits.

Another object of this invention is to provide switches of a particular type for controlling the door operating, door lock and signalling circuits.

Another object of this invention is the provision of switches of this type operable only by an authorized person, such as a guard, for controlling the settings of these switches.

Another object of this invention is the provision of emergency switches operable by an authorized person, or in an emergency, by a passenger for opening one or more of the doors.

Another object of this invention is the provision of a master door controller operable by a guard for unlocking the doors, opening the doors and closing the doors.

Another object of this invention is to provide switches operated by the master door controller for establishing the proper circuit connections for unlocking, opening and closing the doors.

These and many other objects as will appear from the following disclosure are secured by means of this invention.

This invention resides substantially in the combination, construction, arrangement, relative location of parts and circuital connections, all as will be described hereinafter.

Referring to the drawings, in which the same reference numerals will be used to indicate the same or similar parts in the different figures;

Figs. 1 and 1—A taken together comprise a diagrammatic illustration of the door operating apparatus, the control devices and the circuits therefor;

Figs. 2 and 2—A taken together represent diagrammatically the signalling devices, the controls therefor and their circuits.

It is pointed out here, of course, that the circuits shown on the two sets of drawings, 1 and 1—A and 2 and 2—A, are in an actual construction all combined on the one car, but in order to minimize confusion these circuits have been made up in two groups.

Fig. 3 is an end elevational view of an end door engine;

Fig. 4 is a top plan view of an end door engine;

Fig. 5 is an elevational view from the other end of this engine;

Fig. 6 is a side elevational view of this engine;

Fig. 7 is an elevational view from the other side of this engine;

Fig. 8 is an enlarged elevational view of the signalling circuit control switch. This switch is mounted on both the end door engines and the center door engines and is of the same construction in both cases.

Fig. 9 is a side elevational view of this switch taken on a cross-sectional plane through the cover therefor;

Fig. 10 is a cross-sectional view taken on the line 10—10 of Fig. 8;

Fig. 14 is a top plan view of the center door engine;

Fig. 15 is a side elevational view of this engine;

Fig. 16 is a vertical longitudinal cross-sectional view through the cylinders of this engine;

Fig. 17 is an end elevational view of this center door engine;

Fig. 18 is a vertical transverse section taken on the line 18—18 of Fig. 15;

Fig. 25 is a plan view of the contact drum of the emergency switch;

Fig. 26 is a cross-sectional view taken on the line 26—26 of Fig. 25;

Fig. 27 is an outside elevational view of the master door controller;

Fig. 29 is a vertical cross-sectional view of the assembly of Fig. 28 with some parts broken away and other parts not shown in the cross-section;

Fig. 30 is a cross-sectional view taken on the line 30—30 of Fig. 29;

Fig. 31 is a cross-sectional view taken on a plane at right angles to the section of Fig. 29 and substantially in the plane of section line 32—32 of Fig. 30;

Fig. 32 is a cross-sectional view taken on the line 32—32 of Fig. 30 with some parts left out;

Figs. 33 and 34 are perspective views of the rods which interconnect the master door controller and the switch operated thereby;

Fig. 35 is a side elevational view of the switch operated by the master door controller;

Fig. 36 is a front elevational view of this switch;

Fig. 37 is a vertical central cross-sectional view of the electro-magnetically operated control valve for the engines;

Fig. 38 is a similar view of the electro-magnetic control valve for the lock operating means;

Fig. 39 is a schematic layout defining the settings of the drum switches on the cars for a twelve-car train divided into three units of four cars each;

Fig. 40 is a simplified schematic layout of the fluid pressure supply, the door engine, the lock apparatus, the electro-magnetic valves and the control circuits therefor.

Figure 11:
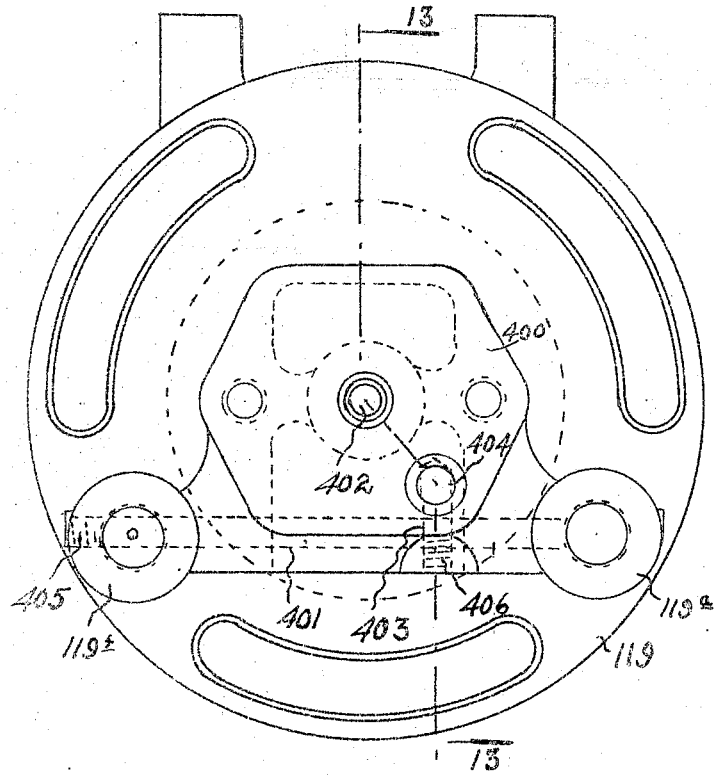
Fig. 11 is an elevational view of the large cylinder head.

This invention is specifically disclosed as applied to passenger vehicles, particularly of the type employed in modern subway systems.

The invention has been shown as applied to cars having four doorways on a side, each doorway being supplied with doors comprising two sections slidable away from and towards each other. It is apparent to one skilled in the art, and hence it is desired to have it strictly understood, that this invention may be applied to many types of vehicles and may with equal facility be applied to buildings. Likewise, the invention may with equal facility be applied to vehicles or buildings having any number of doors and doorways.

As disclosed, the motive devices are of the pneumatic type, although not necessarily so. Two types of engines are employed. At each end of each car on each side there is provided what is termed an "end door engine" for operating solely the extreme end section of each end door. All the remaining sections are operated by what is termed a "center door engine". The center door engines operate the adjacent sections of adjacent doors, so that each center door engine controls two door sections.

This invention involves motive devices of this type for doors, locking mechanism for locking the doors when closed, signalling mechanism for signalling not only when the doors are closed, but also when they are locked and circuits with the necessary control devices to permit of including cars so equipped in a train of any number of cars. These circuits and control devices are so arranged that a train of any number of cars may be broken up electrically into any number of units comprising any number of cars. In addition, control devices are included in these circuits so that a guard may operate all the doors on either side of all the cars of each unit. These functions may be effected not only for the door operating motive devices, but also for the locking mechanism and the signalling devices. In addition, there are provided in these circuits emergency switches which may be operated by an authorized person or, in an emergency, by a passenger so that at least one of the doors on each car may be opened independently of the normal control means.

In the door motor control circuits and the locking mechanism control circuits are provided control switches at each end of each car on each side which may only be actuated to first unlock the doors and then to effect the opening of the doors. The closing and locking of the doors are effected by a single actuation in the opposite direction of these control switches. The connections between the doors and the power devices are so arranged that they will yield in case a passenger or object is caught between the doors to permit their extrication. There are also provided on the end door engines manually operable means for openings the doors sufficiently so that when pressure is applied directly to the doors they may be opened by hand. The same thing applies to the center door engines with the additional feature that, if fluid pressure is on, the doors may be opened by the motive devices by actuation of the manually operable means which acts directly on the electro-magnetic control valve for the motor.

These and many other features not heretofore specifically referred to will be apparent from the following detailed disclosure.

*Door engine and lock circuits*

Figs. 1 and 1—A taken together represent diagrammatically the various elements and circuit connections provided on each car for controlling the power devices for opening and closing the doors and for controlling the locking apparatus. The car has been shown in outline at 1, having on each side four doorways. Each doorway is closed by a door comprising two oppositely slidable sections. In order to clearly differentiate between the use of the end door engines and the center door engines, the sections of the end doors which are operated by the end door engines have been indicated by the symbol "DE". All the remaining sections of the doors which are operated by center door engines have been indicated by the symbol "DC". At each end of each car is provided a circuit control switch which is disclosed in this case in the form of a drum switch and said drum switches have been indicated by the symbols "DS1" and "DS2". It is to be remembered throughout the description of this system that the right-hand end of the car at the right-hand end of Fig. 1—A is the head end of the car, it being assumed that the car moves from left to right. At each end of the car on each side is provided the switch which is operated by the master door controller. The switches at opposite corners are represented by the symbols "MC1" and "MC2". The same symbols have been used on two switches because on consideration it will be apparent that these switches are complementary, since they each perform similar operations from different points. These switches MC1 and MC2 are mounted within the car, while the master door controller which operates them is, as is the usual practice, mounted at the ends on the exterior of the car.

Thus, when these cars are coupled into trains, a guard may stand between two cars and have readily available the master door controllers which he operates as he looks in either directions at the passengers boarding and alighting from the cars.

Since the electrical system is substantially symmetrical, the same symbols have been applied to the contact fingers and contacts on both drum switches DS1 and DS2. There is another very important reason why these same symbols have been used. This will be apparent from looking at Fig. 39, which is a key to the setting of these drum switches. No matter how long the train is there are only three settings possible for the drum switches, and when any one of these settings is made on any car for a train of any length the same connections are made by the drum switches corresponding to that setting. Each drum switch has the fixed contact fingers DO2, 2, DO5, 4, 18A1, 20, 7, TS, 9, 10, DL1, 12, DL4, 14, D2, D2A, D5, D5A, 19, 18, 18A, D6, 27, D8, D1, D1A, D4 and D4A. These are all spring finger contacts, the construction of which will be apparent from consideration of Fig. 21, which will be described later. Contacts 2 and D2A, 4 and D5A, 7 and 18A, 9 and 27, 12 and D1A and 14 and D4A are permanently connected together by jumpers. Mounted on the movable member of the drum switch for movement therewith are the contacts 3, 4', 71, 72, 73, 5 and 6. Contacts 3, 4', 5 and 6 appear in Figs. 1 and 1—A and have to do with the engine and lock circuits. Contacts 71, 72 and 73 appear in Figs. 2 and 2—A and have to do with the signalling circuits. The shape, position and relation of these contacts will likewise be apparent in the detailed consideration of Fig. 21.

Wire D8A is the wire through which power from the positive side of the current supply reaches the various circuits. This wire is connected to the corresponding wire D8A in Figs. 2 and 2—A and finally connects to the positive current supply wire 102 as will be described later. Wire D8A (Fig. 1) is connected to wire D88 which, in turn, is connected at one end to spring finger D9O and at the other end to wire D84. Wire D84 interconnects the jumper connections D83 and D85 of the switches MC1 and MC2. The jumper connections D83 and D85 electrically connect the fixed contacts D82 and D81 and D86 and D87, respectively. Fixed contact DO3 is connected by wire DO1 to spring finger DO2. Fixed contact DL2 is connected by wire DL to spring finger DL1. A1 and A2 are the movable switch arms of switch MC1. Contact DO6 is connected by wire DO4 to spring finger DO5. Fixed contact DL6 is connected by wire DL5 to spring finger DL4. A3 and A4 are the movable switch arms of switch MC2. Wire D11 is connected to spring finger D4. Wire D21 is connected to spring finger D5. Wire D51 is connected to spring finger D1. Wire D41 is connected to spring finger D2. Wires D11, D21, D51 and D41, together with other wires to be described later, all terminate in a connector device of the usual type by means of which the jumper connection between cars is made when they are coupled up into a train.

Spring finger D5A is connected by wire D5A1 which extends through the car to the corresponding spring finger D5A on drum switch DS2. This wire D5A1 is connected by wire D5A2 to a fixed contact of snap switch 16 on end door engine 27. The corresponding fixed contact of the snap switch is connected by wire 13' to one terminal of the solenoid winding of the electro-magnet valve 13 which has its other terminal grounded. Spring finger D1A is connected by wire D1A1 which runs to the corresponding spring finger D1A on drum switch DS2. Spring finger D4A is connected to wire D4A1 which extends through the car to the corresponding contact D4A on drum switch DS2. Wire D4A2 connects wire D4A1 with one terminal of the solenoid winding of the electro-magnet valve 30 which has its other terminal grounded. Spring finger D2A is connected by wire D2A1 which extends through the car to the corresponding spring finger D2A on drum switch DS2. Wire D2A1 is connected by wires D2A2 to one of the fixed contacts of the snap switches on the center door engines 28. The corresponding fixed contacts of these snap switches are connected by wires to one terminal of the solenoid winding of the electro-magnet valves 34, the other terminals of which are grounded. Likewise, the end door engine 29 has the winding of its magnet valve 35 grounded at one terminal and connected at the other terminal to one of the fixed contacts of snap switch 16. The corresponding fixed contact of this snap switch is connected by wire D2A2 to wire D2A1. Likewise, wire D5A1 is connected by wires D5A2 to the snap switches 16 on the center door engines 28 on the other side of the car. The corresponding fixed contacts of these snap switches are connected by wires to one terminal of the windings of the electro-magnet valves 34 which have their other terminals grounded. Wire D5A1 is also connected by wire O21 to spring finger O2 of emergency switch ES2. A corresponding spring finger O1 is connected by wire O11 to a fixed contact of snap switch 16 on end door engine 29 on the other side of the car. A corresponding fixed contact of this switch is connected to the magnet valve 29 which has its other terminal grounded. Wire D2A1 is connected by wire O21 to spring finger O2 of emergency switch ES1. The corresponding spring finger O1 of this switch is connected by wire O11 to snap switch 16, which, in turn, is connected by wire 13' to one terminal of electro-magnet valve 13 which has its other terminal grounded.

Wire D1A1 is connected by wire D1A2 to electro-magnet valves 21 for the center door engines 28 on one side of the car, which valves have their other terminals grounded. The left-most wire D1A2 is connected by wire L1 to spring finger L of emergency switch ES1. The corresponding spring finger 1L is connected by wire 1L1 to one terminal of the electro-magnet valve 30 for end door engine 27, which valve magnet has its other terminal grounded. Wire D1A1 is also connected by wire D1A2 at the forward end of the car to one terminal of the magnet valve 32 of end engine 29, which valve magnet has its other terminal grounded. For the other side of the car wire D4A1 is connected by wire D4A2 to one terminal of magnet valve 30 of end engine 27, which valve magnet has its other terminal grounded.

Wire D4A1 is also connected by wires D4A3 to one terminal of the magnet valve 21 for center door engines 28, which valve magnets have their other terminals grounded. Wire D4A3 at the forward end of the car is connected by wire L1 to spring finger L of emergency switch ES2. The corresponding spring finger 1L is connected by wire 1L1 to one terminal of magnet valve 32 for the forward end engine 29, which valve magnet has its other terminal grounded. The connections of switches MC1 and MC2 at the forward end of the car (Fig. 1—A) to the drum switch will not be given in detail, since they are the same as the connections given with regard to those switches at the rear end of the car. The same remarks apply to wires D11, D21, D51 and D41 at the forward end of the car.

With regard to emergency switch ES1, the spring finger R1 corresponding to spring finger D9O is connected by wire R11 to one terminal of the solenoid winding R12, which has its other terminal grounded. The spring fingers of emergency switch ES1 are interconnected in the proper manner by means of contacts 37 and 38 on drum 730 and a contact 731 (Fig. 26). The operation of this drum switch will be clearer when it is described in detail, in connection with Figs. 23, 24, 25 and 26. A similar emergency switch ES2 is provided at the forward end of the car with similar parts and similar connections.

For the sake of clarity, the end engines at the rear end of the car have been designated by the numeral 27 and the end engines at the forward end of the car have been designated by the numeral 29. The center door engines for both sides of the car have been designated by the numeral 28.

Signal circuits

The signalling devices and circuits are set forth in Figs. 2 and 2—A. As before, the outline of the car has been indicated at 1, and the doors represented in the same way by the symbols "DE" and "DC". The drum switches DS1 and DS2 are now shown with the connections to those spring fingers which were not shown connected in Figs. 1 and 1—A, while those spring fingers which were shown connected in Figs. 1 and 1—A are not shown connected in Figs. 2 and 2—A. It must be remembered that in an actual installation of the circuit connections shown in these four figures are together on each car. Spring finger 18A1 on drum switch DS1 is connected by wire 51 to one contact of push button switch 50. The other contact of this switch is connected by wire 49 to a fixed contact which is controlled by movable contact 46. A corresponding fixed contact is connected by wire 45 to one fixed contact of switch 44. The other contact of this switch is connected to wire 211, which wire extends in one direction to the jumper connection and in the other direction through the car to a fixed contact on electro-magnetic switch EM. At 54' are two signal lamps connected in parallel with one side grounded and the other side connected by wire 53 to a fixed contact. At 47 and 48 are two movable contacts which, together with movable contact 46, are mounted on a movable member, such as a drum, which is operated by the reverser controller which is actuated by the motorman, who runs the train. When car 1 is not the head car so that the train is not being controlled by the motorman from that end, he removes the control handle from the controller. As is usual in this art, he can only remove this control handle when the parts operated thereby are in one position which may be termed the "neutral position". In this neutral position contacts 46, 47 and 48 are in the position with respect to the fixed contacts in which they are shown in Fig. 2. When the motorman is driving the train from the end of car 1, under discussion (and these remarks apply to either end depending upon the direction of movement of the car), if he is going forward contact 47 will be moved to bridge the fixed contacts connected to wires 53 and 45. If the car or train is going backwardly the control lever of the master controller must be moved to a position which causes contact 48 to interconnect wires 45 and 53. Thus, before the motorman can operate the train, either forwardly or backwardly, he must move the master controller arm to the proper position which causes contact 47 or contact 48 to interconnect wires 45 and 53, depending upon whether the car is to go forwardly or backwardly. In either case, wires 45 and 53 are interconnected. It is only when the master controller is in neutral position, as shown in the drawings, that contact 46 interconnects wires 45 and 49. Of course, the master controller on all the cars at each of the ends of those cars on any train are all set in neutral position with the exception of the master controller at the forward right-hand end of the forward car of the train, from which point the motorman is operating the train. At that point either contact 47 or 48 interconnects wires 45 and 53, depending upon whether the motorman is operating the train forwardly or backwardly respectively.

Wire 49 is connected by wire 52 to spring finger D8. Wire 53'' connects wire 52 to one terminal of push button switch 53'. The other terminal of this switch is connected by wire 54 to spring finger 18A. Spring finger 20 is connected by wire 55 to one terminal of the signalling buzzer 56, which has its other terminal grounded. Wire 181 is connected to spring finger 18. Wire 54 is connected by wire 18A1' which extends through the car to the corresponding contact 18A on drum switch DS2. Spring finger TS is connected by wire 57 to one terminal of a signal lamp 58, which has its other terminal grounded. Spring finger D6 is connected to wire D61. It should be noted here that wires 211, 181 and D61 also go to the jumper connection and comprise, with wires D11, D21, D51 and D41, all of the wires which extend through the jumper connections from car to car. Wire 52 is connected by wire D8A through the car to spring finger D8 on drum switch DS2. Spring finger 27 is connected by wire 27A through the car to a fixed contact on the electro-magnetic switch EM.

This electro-magnetic switch EM has a fixed contact 89 which is connected directly by wire 88 to the positive side of the current source. This gives a connection to the positive side of the current source independent of the connection D8A. The electro-magnet switch EM has three movable switch arms 87, 90 and 91 to cooperate with the three fixed contacts. Movable switch arm 87 is connected to wire 86. Movable switch arm 90 is connected to wire 211 which comprises a continuation of wire 211 to the fixed contact cooperating with switch arm 90. This continuation wire 211 extends through to the jumper connection at the forward end of the car. Switch arm 91 is connected to contact 27 on drum switch DS2 by wire 92. Switch arms 87, 90 and 91 operate in unison by means of the plunger rod 93 which is controlled by the solenoid winding 94, one terminal of which is grounded. Mounted on each side of the car on the outside are the signal lamps 84'' and 85, each of which has one terminal grounded. The other terminals of these signal lights are connected by wire 83 which, in turn, is connected to wire 86.

It will be noted that all of the end and center engines 27, 28 and 29 are provided with a motor switch, consisting of a movable contact 60 and fixed contacts 60' and 60''. The construction and operation of these motor switches will be made clear in connection with the detailed description of these motors. It will be noted that all of these motor switches are connected in series in the following manner, starting at the positive side of the current source to wire 102, switch 101, fuse 100, wires 99, 69, 68, 67, 66, 61, 62, 63, 64, 65, 95 to the ungrounded terminal of winding 94. Each motor switch is shunted by a snap switch 16. At this point it is pointed out that the snap switch is of a well-known construction, comprising four fixed contacts mounted in a circle with 90 degrees separation. The movable part of the switch comprises two arms which are fixed at right angles with respect to each other. These arms lie in parallel planes one above the other. The fixed contacts are arranged in pairs diametrically opposite to each other, each pair lying in parallel planes one above the other. In one position of the movable arms, one pair of contacts is bridged and the other pair is not bridged, and likewise in the other position of the arms, the first mentioned pair of contacts is not bridged and the second pair is bridged. Thus, in one position of these snap switches the electro-magnet valves 13, 34 and 35 are connected in series (see Figs. 1 and 1A) and the motor switches are not shunted. In the other position of these snap switches, these magnet valves are cut out of circuits and the motor switches are shunted. By reason of this arrangement, it is possible by the operation of any one of these snap switches to cut the corresponding motor in and out of circuit. When any particular motor is cut in circuit, its motor switch is not shunted so that it may have control of the signal circuit. However, when the motor is cut out so as not to be operable through the control circuits, its corresponding motor switch is shunted so as to complete the signal circuit past that motor, for the obvious reason that that motor being cut out is not operated. Thus, any motor can be cut out so as not to be controllable by the guard (if it should get out of order, for example) without interrupting the signal circuits which still remain under the control of the motor switches on all the operating motors. Any motor, when cut out of circuit, will of course be in door closed and locked position with its motor switch closed and switch 16 will be set to break the motor control circuit at which time it shunts the motor switch as a safety feature.

The motorman's signal lamps 106 corresponding to lamps 54', the switches having the movable contacts 98, 103 and 104 operated by the reverser controller, and corresponding switch having contacts 46, 47 and 48, switch 96 corresponding to switch 44, signal lamp 110 and push button 78 corresponding to signal lamp 58 and push button 50, push button 84' corresponding to push button 53' and buzzer 108 corresponding to buzzer 56 have been given these different numerals, notwithstanding the fact that these devices and their connections at the forward end of the car are the same as the corresponding devices and their connections at the rear end of the car because in the description of the operation of the circuits, the circuits can be followed through more clearly. This policy is contrary to the policy used in connection with the drum switches, the emergency switches and the switches MC1 and MC2 operated by the master door controllers, because the use of the same symbols for these devices will aid in tracing the circuits.

Now going into detail, wire 211 is connected to one of the fixed contacts of switch 96 and the other contact of the switch is connected by wire 97 to the fixed contact controlled by movable contact 98. The other contact controlled by this movable contact 98 is connected to wire 99. Movable contacts 104 and 103 correspond to the forward and reverse movable contacts 47 and 48. As before, lamps 106 are connected in parallel and have one terminal grounded, while their other terminal is connected to a fixed contact which is controlled by movable contacts 103 and 104. Wire 99 is connected by wire 70 to one of the fixed contacts of push button switch 78. The other contact of this switch is connected by wire 79 to spring finger 18A1 on drum switch DS2. Spring finger TS is connected by wire 109 to one terminal of signal lamp 110 in the casing 77 with push button switch 78. The other terminal of signal lamp is grounded. Spring finger 20 is connected by wire 107 to one terminal of buzzer 108, which has its other terminal grounded. Wire 70 is connected by wire 80 to wire D8A. Wire 80 is connected by wire 84 to one of the fixed contacts of push button switch 84'. The other terminal of this push button switch is connected by wire 82 to wire 18A1.

A little explanation of these various elements will be helpful here. Lamps 54' and 106 are provided, as will be noted from the drawings, inside of the car at diagonally opposite ends so as to be adjacent the motorman's control point. It is these lamps, depending upon which end of the car the motorman is, which signal to him when the doors are closed and locked. Two lamps are provided at each station in parallel for the sake of safety, since if one burns out the other may still function long enough to substitute a new lamp for the burned out lamp. The main power supply is introduced into the system through wire 102, and more directly for purposes of safety through wire 88 to the signal lamps 84" and 85. Buzzers 56 and 108 are also mounted adjacent the motorman's control point so that the train guards can signal through to him to proceed when they know the doors are all closed and locked, in the event that the motorman does not get for some reason the signal to proceed from his signal lamps. Thus, the buzzers and signal lamps at the motorman's station either supplement each other or give alternative signals to proceed. Likewise, these buzzers 56 and 108, as will be described later, with the exception of the one at the motorman's station, provide means for the guards on each unit of the train to send a signal forward from unit to unit to proceed to the last guard, who sends the signal on finally to the motorman. Push buttons 50, 53', 84 and 78, as will appear later, are provided for operation by the guards and motorman to signal each other. Signal lamps 58 and 110 provide signals for the guards to show that the doors in their zone are closed. Signal lamps 84" and 85 on the outside of the cars give a danger signal to the guards that the doors on that car are open. The energy for these signal lights is applied through another path from the positive side of the current source through wire 88. It is also pointed out that switches 44 and 96 are switches well known in the art and are known as "coupler" switches. Either or both of these switches is closed when the car is uncoupled at the end or ends corresponding thereto. Thus, coupler switch 96 is shown closed because it is intended that the right-hand end of this car be the head end of the train. Likewise, switch 44 is shown open because it is intended to show that the rear end of this car, which is adjacent the forward end of the next car, is coupled through the car circuits by means of the jumper connection.

Before describing the operation of the various circuits, detail reference will be made to the various pieces of apparatus entering into the system, in order that the operational description will be more completely understandable.

End door engine

The end door engine and its details are shown in Figs. 3 to 7 inclusive. The engine comprises a suitably formed base 115, which has mounted thereon a central casing in which are secured in alignment the small cylinder 116 and the large cylinder 118. The end door engine, as well as the center door engine, is of the differential type. Small cylinder 116 is closed at its outer end by its cylinder head 117, and large cylinder 118 is closed at its outer end by its cylinder head 119. The fluid pressure supply pipe 121 is connected to cylinder 116 through a cushioning device 120 which forms no part of this invention and is, in fact, well known in the art in many forms. The cushioning device is directly connected to the cylinder 116 through the head 117, so that fluid pressure is always supplied to the smaller cylinder through pipe 121. Cylinder head 119 is provided with two connecting nipples 119ª and 119ᶠ. Pipe 121 is connected to a coupling T 122 which, in turn, is connected by pipe 123 and coupling elbow 123' to nipple 119ª. Coupling T 122 is also connected by pipe 122' to the electro-magnetic valve 30. The internal passages of this valve will be described later. This valve is also connected by a passage 144 to the lock operating cylinder 145. At 119ᵇ is a hand valve which is intended to receive the pipe which extends from the fluid pressure supply source. The outlet of this valve is connected to the air strainer 119ᶜ which has its outlet connected to pipe 119ᵈ which, in turn, is coupled by the coupling elbow 119ᵉ to the coupling nipple 119ᶠ. Mounted on the cylinder head 119 is the electro-magnet valve 13. The internal passages in the head 119 and their connection with the ports and passages of valve 13 will be described in detail later. Lock cylinder 145 is of the simple usual type, having a piston and spring therein which, in this case instead of being connected to the operating part by means of a piston rod, is provided with a short piston rod which, in turn, is connected to the part to be operated by means of a coil spring 146. Pivotally mounted on base 115 under cylinder 118 at 148 is the lever 147. This lever is connected to the piston in the lock cylinder at 149 by this coil spring 146. Lever 147 is pivotally connected by lever 150 to the locking lever 153 at 151. This locking lever is pivotally mounted on the base by means of the stud 154. The locking lever 153 is provided at its outer end with a suitably shaped projecting portion 155 which, when the motor is properly associated with the door which it operates, projects into the path of movement in the door at its rear edge. Secured on the end surface of the locking lever 153 is a tripping lug 156 (Fig. 6). Base 115 is provided with bored supports 136 in which is slidably mounted the rod 137'. This rod is encircled between the supports by a coil spring 138 which rests against one of the supports 136 and against a collar secured to the rod (Fig. 4). Thus, sliding movement of rod 137' is resisted by spring 138 and hence this rod is normally in the position shown in Fig. 4. Rod 137' is provided with a right angle portion 137 which is provided with an adjustable screw 139, which may be adjusted longitudinally and set at any desired position.

A portion of the car wall is shown in Fig. 4 to show the association of the door and motor with respect thereto. A portion of the end door is shown at DE. The car wall is arranged so that the door DE may slide either to the right or left (Fig. 4). The door is shown in closed position in this figure. Ball bearing guides are provided, as shown, to guide the door in its movement and to facilitate its easy movement. Secured to the backing edge of door DE is a vertical U-shaped channel 142 (it being remembered that in Fig. 4 one is looking down on the apparatus). Also secured to the rear edge of the door DE is a bracket 143 which is so mounted as to engage the adjustable screw 139 just as the door is completing its closing movement, so that rod 137' is caused to slide with it. Locking lever 153 is shown in Fig. 4 in locking position. It is shown in Fig. 6 in unlocked position. It will be noted from Fig. 6 that rod 137', which is in its normal position, is in the path of movement of the projecting cam 156 on the lower surface of the locking lever 153. Thus, with the parts shown as they are in Fig. 6, the locking lever 153 is held back out of locking position, that is, it has rotated in a clockwise direction to a horizontal position (Fig. 4). It is held in this position by the engagement of rod 137' with the projecting cam or lug 156. When the door is just about closed the rearwardly projecting arm 143 engages bolt 139, causing rod 137' to slide to the right (Fig. 4) and to the left (Fig. 6) out of engagement with lug 156. As a result, locking lever 153 is caused to rotate in a counterclockwise direction (Fig. 4) to the position shown in this figure, that is, into the path of the door. It is noted that there is some space between the locking lever and the projecting arm 153. The reason for this will be described shortly. The counter-clockwise rotation of locking lever 153 is effected by reason of the pull exerted thereon by spring 146 through levers 147 and 150. Within the locking cylinder, as is usual, is mounted a spring which lies between the forward face of the piston and the forward end wall of the locking cylinder. When fluid pressure is supplied behind the piston this spring is compressed, but when it is exhausted from the cylinder this spring returns the piston to normal position, which would be in a downward direction (Fig. 4). This movement of the piston in the locking cylinder places spring 146 under tension, the spring within the cylinder being strong enough to do this. It is for this reason that locking lever 153 moves to the position shown in Fig. 4, when it is released by rod 137', being moved by the door. The base is provided with a stop 152 (Fig. 4) to limit the counter-clockwise movement of lever 153 to the position shown. The central casing 125 of the motor is provided with a projecting hub 126 within which is rotatably mounted shaft 161. The manner in which this shaft is rotated will appear later.

To one end of this shaft is secured a collar 127 which has the oppositely projecting arms 128. Secured to these arms is a channel-shaped lever 129, the form of which is clear from Figs. 5 and 6. Slidably mounted in this arm is a lever 130 which is provided at its outer end with a roller 131. This roller moves in the channel 142 on the back edge of the door (Fig. 4). One of the arms 128, as is clear in Fig. 4, is provided with an integral upstanding lug 135 having a hole therethrough. On the end of lever 130 near the roller is secured an upstanding lug 132 having a hole therethrough (Fig. 6). Extending through these lugs is a long rod 133 which is held in locked position on lug 132 by means of locking nuts. This rod is encircled by a coil spring 134 which abuts against lug 135 and the locking nut at the other end. As will be clear from Fig. 6, this construction permits a longitudinal sliding movement of lever 133 in the supporting arm 129 against the resistance of spring 134. By reason of this construction should a person be caught between the doors he may, by pushing on them in a longitudinal direction, cause them to move a short distance in the opening direction against the action of this spring 134. This permits him to extricate himself. It is for this reason that the locking lever 153 (Fig. 4) is spaced a short distance to the rear of the bracket 143 on the rear edge of the door. In actual practice, this distance is about 2½ inches. Since the apparatus is constructed so that each section of a door may be forced open a distance of 2½ inches, it is possible to separate the forward edges of the doors a distance of 5 inches, which is sufficient to permit a person to extricate himself if he catches an arm or leg between the doors.

Slidably mounted below the cylinders and approximately centrally in a transverse direction of the casing 125 is a bar 157 (Figs. 4, 5 and 8). The exact arrangement of this bar is shown more clearly in Fig. 20, it being quite similar to a corresponding bar on the center door engines. Bar 157 is provided with a recess 157' (Fig. 5) on its upper edge in which the rounded end 158 of lever 147 operates. Thus, a rotation of lever 147 not only actuates the lock lever 153, but it also causes bar 157 to slide back and forth for purposes to be shortly described. On the end of shaft 161, opposite the door operating levers, is mounted a pin 162. Rotatably mounted on this projecting end of shaft 161 is a collar 163$^a$ which is integrally secured to a manually operable lever 160. This collar is cut away at one end to provide a lug 163 which moves in the path of pin 162. On the lower surface of collar 163$^a$ is mounted a cam 163' (Figs. 5 and 7). Below these parts is a casing 60$^a$ which is held in place by means of the wing nut 60$^b$.

Within this casing, as shown in Figs. 8, 9 and 10, is the motor switch. On brackets 200 is mounted a lever 180 on the short shaft 201 (journaled in 200). The upper end of lever 180 is provided with a projecting end 181' in which is mounted a longitudinally adjustable screw 180$^a$. This screw is adapted to be engaged by the cam 163'. It may be well to point out here that as a matter of fact these details of construction shown in Figs. 9 and 10, inclusive, have been shown in connection with the center door engine, but they are now being described in connection with the end door engine since, with regard to these parts being described, that is, the motor switch, they are exactly the same. Mounted in lever 180 and insulated therefrom is the contact pin 60. This contact pin is adapted to engage the resiliently mounted contacts 60' and 60''. Secured to the side of casing 125 is a block of insulating material 202 on which are mounted the metal brackets 60$^c$. These metal brackets pivotally support on the short pins 60$^d$ the contacts 60' and 60''. The flexible conductors 60$^e$ provide positive electrical contact between contacts 60' and 60'' and the brackets 60$^c$. The outward movement of these contacts is limited by pins 60$^f$ which have adjustable stops thereon. Encircling the pins 60$^f$ are springs 60$^g$ which permit the inward movement of 60' and 60'' against their resistance. The brackets 60$^c$ are connected by wires, as shown, to the circuits as is clear in Figs. 2 and 2—A. The lower end of lever 180 is pivotally connected to the slidable bar 157, as is clear in these figures. The cam 163' is shaped so that when lever 160 is rotated upwardly in a counter-clockwise direction the cam surface will engage screw 180$^a$, causing the lower end of lever 180 (Fig. 9) to move to the right, pulling bar 157 with it. Resistance to this movement is caused by spring 146 (Fig. 4) through lever 147. The movement of lever 147 causes the movement of locking lever 153 through the agency of lever 150, so that the locking lever is moved in a clockwise direction to unlocking position. The movement of all these parts is thus effected manually through the agency of lever 160. Spring 146 is put under tension by the movement of these parts, so that upon the release of the locking lever the parts will all snap back to the position shown in Fig. 4. In addition, lever 180 moves to the left in Fig. 9, causing contact 60 to engage the contacts 60' and 60''.

The movement of these parts is all effected before lug 163 on collar 163$^a$ engages pin 162 (see Fig. 8). Further movement of lever 160 causes a counter-clockwise rotation of shaft 161 (Fig. 8). This movement of shaft 161 causes the door connecting levers, including lever 130, to move in a counter-clockwise direction (Fig. 6), moving lever 130 out of horizontal position and opening the section of the end door connected thereto sufficiently, so that a person may apply pressure to the door and open it all the way. This cannot be done when the parts are in their normal position because lever 130 and its parts are in a horizontal position. It will be seen, therefore, that the operation of this apparatus manually by lever 160 causes first an unlocking of the door and an opening of the motor switch before the door is given any opening movement. Further movement of lever 160 opens the door sufficiently so that it can be completely opened by hand. Lubrication is supplied to bar 157 and its guides 130′ through the pipe 500 (Figs. 4 and 5).

Also mounted on the supporting base 115 is an integral standard 16′ on which is secured the snap switch 16. Wire 13′ which extends from this snap switch goes to the magnet valve 13 (Fig. 3). The wires from the motor switch are shown which extend to the snap switch.

Figure 13:
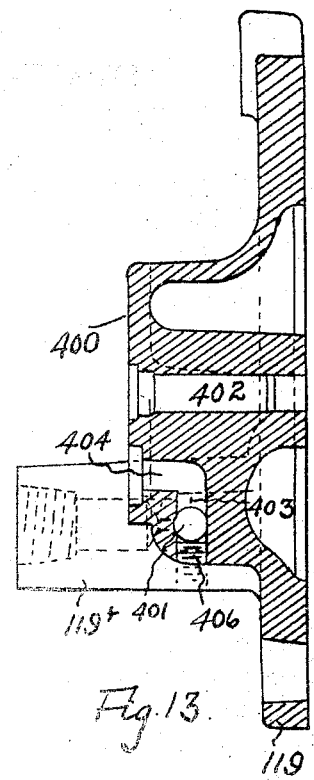
Fig. 13 is a cross-sectional view taken on the line 13—13 of Fig. 11.
Figure 12:
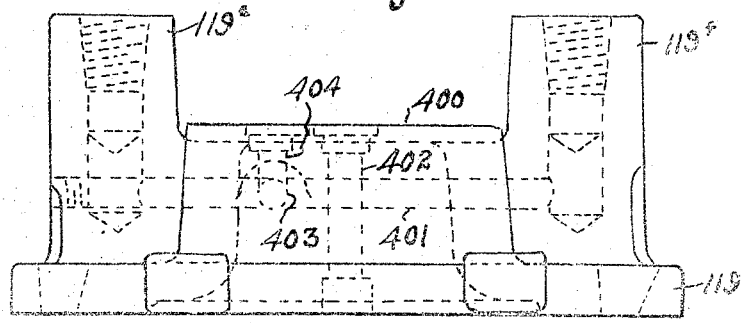
Fig. 12 is a side view of this head.

The large cylinder head 119 is shown in detail in Figs. 11, 12 and 13. As is clear in these figures, the coupling nipples 119$^a$ and 119$^f$ are interconnected within the body of the head by passage 401. This passage 401 is connected by a right angle passage comprising the portions 403 and 404. This passage is made by two bores at right angles to each other, as is clear in Fig. 13. The lower end of passage 403 is sealed by means of a small plug 406. Passage 404 issues through a seat 400 on the outer face of the head. The central passage 402 extends entirely through the head. The face of the head opposite to seat 400 is the face which is secured to the cylinder end and is exposed at the central portion to the inside of the cylinder. Thus, passage 402 opens directly into the large cylinder. It is pointed out in connection with Fig. 11 that passage 401 is bored straight through from the left and then sealed by plug 405. The seat 400 on this head receives a complementary seat which forms a part of the electro-magnet valve which is mounted thereon.

It may be well to refer to the magnet valve 13 which is mounted on head 119. It is pointed out here that magnet valve 13 is exactly the same as magnet valves 34 and 35 (Figs. 1 and 1—A). They have merely been given different numerals in this figure to aid in the description of the operation of the apparatus. This electro-magnet valve 13 is known as the exhaust type of valve. It is, of course, very well known in the art, but is described in detail here to aid in understanding the operation of the system of this invention. The valve comprises a casing having a cover within which is mounted the solenoid winding 13$^f$. This valve has a movable plunger 13$^e$ and may be manually operated by means of a pin 13$^i$ which extends through the cover. The solenoid has a fixed armature 13$^h$ in which is slidably mounted a rod 13$^b$ which projects above the armature. The casing is provided with an integral extension 13$^i$, which has a central bore closed by a plug 13$^j$. Within the extension is a valve seat 13$^k$ and the inner end of plug 13$^j$ is also provided with a seat. Rod 13$^b$ is provided with a seat 13$^m$ and is also provided at its lower end with a seat 13$^e$. A spring, as shown, normally holds the rod 13$^b$ in the position shown so that seat 13$^m$ engages the seat on the plug 13$^k$. A passage 13$^n$ is provided into the extension below the valve formed by seat 13$^e$ in the end of plug 13$^j$. Likewise, a passage 13$^d$ extends into the extension between the two valves thus formed. The space above plug 13$^k$ is open to the atmosphere through passages 13$^a$. The coupling sleeves 404$^a$ and 402$^a$ fit snugly into the passages 404 and 402, respectively, of cylinder head 119 when the valve is properly secured on the seat 400.

The electro-magnet valve 30 shown in Fig. 38 is of the pressure type and is also well known in the art. This valve 30 is exactly the same as valves 21 and 32 in Figs. 1 and 1—A—separate numbers only being used to aid in the description of the operation of the circuits. Valve 30 comprises a casing, as described before, having the solenoid winding 30$^b$ and the movable plunger 30$^c$. There is also provided, in the case of valve 13, a fixed armature and a slidable rod therein. The valve casing has an extension 30$^g$ closed by a plug 30$^h$. Within the extension is the plug 30$^i$ with a seat formed thereon and a second plug 30$^j$ with a seat thereon. The slidable rod is provided with seats 30$^f$ and 30$^e$ to cooperate with the seats on the plugs. A spring 30$^k$ normally holds the rod in the position shown in the figure. The space between plugs 30$^h$ and 30$^j$ is connected by passage 30$^m$ which extends through the wall of the extension. The space between plugs 30$^j$ and 30$^i$ is connected by passage 30$^n$ which extends through the extension. The space above plug 30$^i$ is exposed to the atmosphere through passages 30$^a$. When the parts are in the normal position, rod 30$^d$ is in the position shown, that is, when winding 30$^b$ is deenergized. Passages 30$^m$ and 30$^n$ are connected by the coupling members 122′ and 144 to the T 122 and the lock cylinder 145, as shown in Fig. 4.

*Center door engine*

Referring to Figs. 14 to 20, inclusive, the center door engines will be described in detail. Since many of the parts of this engine are the same as the corresponding parts of the end door engine, they will not again be referred to in detail. It may be well to note here that the end door engines 27 and 29 are exactly the same, but have been given different numerals in Figs. 1 and 1—A to aid in the description of the operation. As before, the engine comprises a base 115, small cylinder 116, large cylinder 118 and central casing 125, all connected together. The lock cylinder 145, the magnet valves 13 and 30, the snap switch 16 and the motor switch are also provided as before. The transverse shaft 161 journaled in the hub 126, provided with the collar 127 and arms 128, is as before. Shaft 161 may be rotated by means of lever 160 through the collar 163ª, lug 163 and pin 162. The collar has cam 163', as before, (Fig. 18) and the motor switch is the same. The slidable latch bar 157 is provided, as before, and is connected to lever 180. This slidable bar is, however, notched at its outward upper end, as is clear from Fig. 18. Fluid pressure reaches the larger cylinder through head 119 and the transverse passage therein, as described before. Fluid pressure supply is introduced into the head through the coupling nipple 119ᶠ. Fluid pressure is also supplied to the magnet valve 30 through the cushioning device 120 from pipe 123ª as before. The features which distinguish this engine from the end door engine will now be described.

Figure 19:
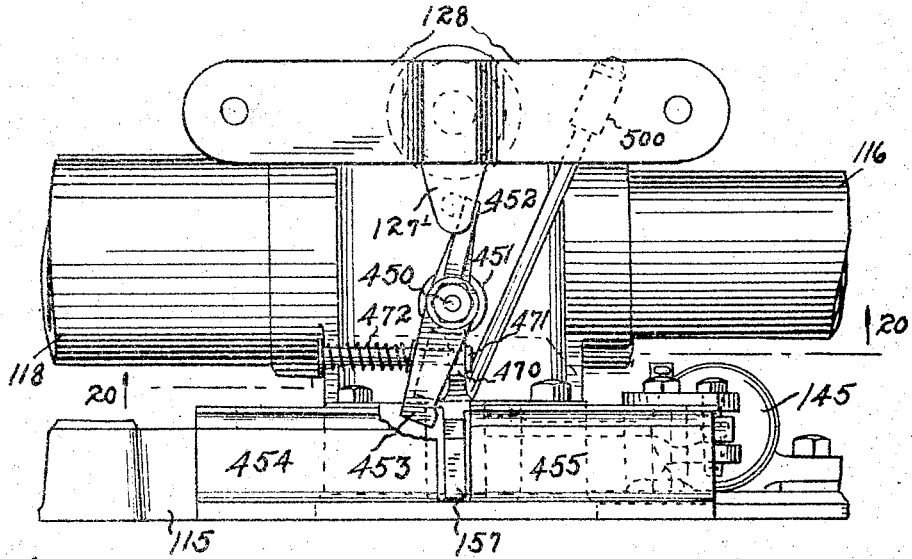
Fig. 19 is an enlarged detail view of the locking mechanism for the center door engine.
Figure 20:
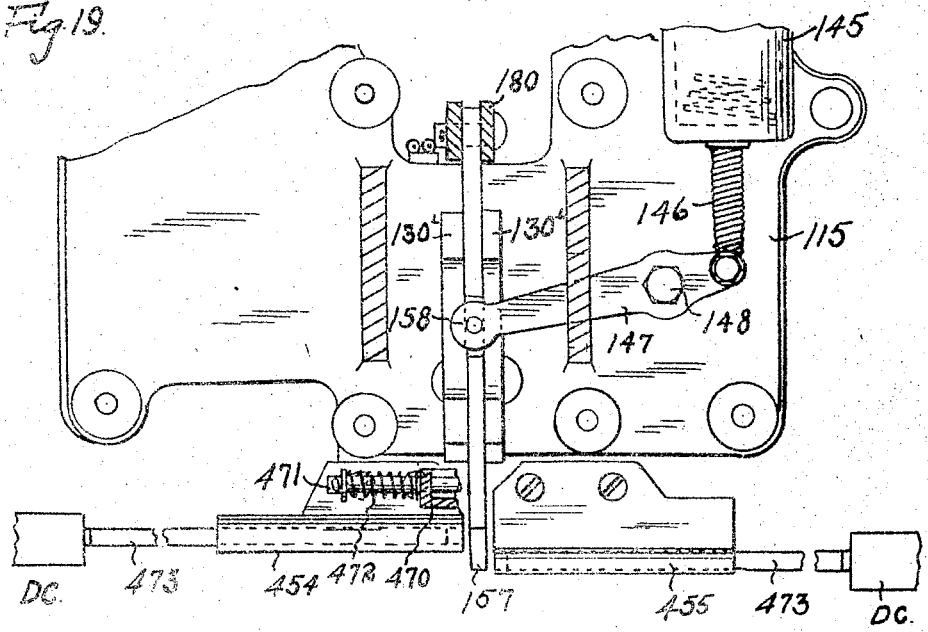
Fig. 20 is a cross-sectional view taken on the line 20—20 of Fig. 19.

It is clear from Fig. 15 that collar 163ª is provided with a short projecting lug 163ᵇ which is pivotally connected to rod 163ᶜ. This rod freely passes through an opening in arm 163ᶠ. This arm is rotatably supported on bracket 163ᵈ secured to the cylinder head 119. Arm 163ᶠ is integrally secured to right angle arm 163ᵍ, the two of them forming, in fact, a bell crank lever. Encircling the end of rod 163ᶜ is a spring 163ʰ which abuts against the locking nuts at one end and lever 163ᶠ at the other end. By this construction upon movement of lever 160, the outer end of lever 163ᵍ is caused to move downwardly by reason of the pull exerted thereon through rod 163ᶜ, spring 163ʰ and lever 163ᶠ. The downward movement of the outer end of lever 163ᵍ causes the downward movement of plunger 13ᶜ (Fig. 37) and rod 13ᵇ, unseating the valve 13ᵐ and seating valve 13ᵉ for reasons to be described later. Another distinguishing feature of this engine over the end door engine is the manner in which it is connected to the door sections and the manner in which the door sections are locked. As shown in Fig. 14, the projecting arms 128 secured to shaft 161 by collar 127 are pivotally connected to the adjacent sections of two center doors by means of pivoted links 473ª. As shown in this figure, there is attached to the rear edge of each door a bar 473 which slide in guides 454 and 455. These guides are separated by a small space as is clear in Fig. 19, so that bar 157 may slide between them as shown in Fig. 20. The door sections DC in Fig. 14 are shown in door closed position. As a result, there is a space, as shown, between the ends of bars 473 within the guides and the projecting end of bar 157. By this arrangement, each section of the doors may be slid back for a sufficient distance to permit the escape of a person if caught between the door sections. In other words, as before, the door sections may be opened by a distance of approximately 2½ inches before the bars mounted thereon strike the locking bar 157. As is clear from Fig. 20, locking bar 157 is slid back and forth in the guides 130' by reason of the rotation of lever 147. When the locking bar 157 is withdrawn from locked position, it is held in that position by means of lever 453 (see Fig. 18). This lever is pivotally supported, as shown, on a short shaft 450. It is normally urged into locking engagement with bar 157 by means of spring 472 (Fig. 19) which is mounted on pin 471 secured in a projection 470 on the casing. This lever 453 comprises a central hub 451 with projecting arms 452 and 453. It is the arm 453 which engages with the locking bar 157. Arm 452 engages with a pin mounted on arm 127' formed on collar 127. When the doors are in closed position, arms 128 are horizontal (Fig. 19). Just as they reach this horizontal position, the pin on arm 127' has caused arm 453 to release bar 157 by engagement with arm 452. As a result, bar 157 shoots out into the position shown in Fig. 20. This is caused by the pulling action of spring 146, as before. With bar 157 in the position shown in Fig. 20, the door sections are locked in closed position with the exception of the small movement above described to permit the release of a passenger if caught between the door sections.

The internal construction of both types of engines is substantially the same and is clearly set forth in Figs. 16 and 18. Within cylinder 116 is mounted piston 602 and within cylinder 118 is mounted piston 603. These pistons are connected by a piston rod 601 which has teeth formed on the top thereof. The piston rod is hollow so that the cushioning device 604 may slide therein. This cushioning device is of an old and well-known type and is not by itself any part of this invention. The piston rod extends through casing 125 at the apertures 125ª. Journaled in casing 125 and extending transversely thereof is the shaft 161 on which is mounted the segmental gear 600, meshing with the rack formed on the piston rod. Thus, as the pistons move back and forth as a unit gear 600 is caused to revolve, oscillating shaft 161 and the parts connected thereto.

*Drum switch*

Figure 21:
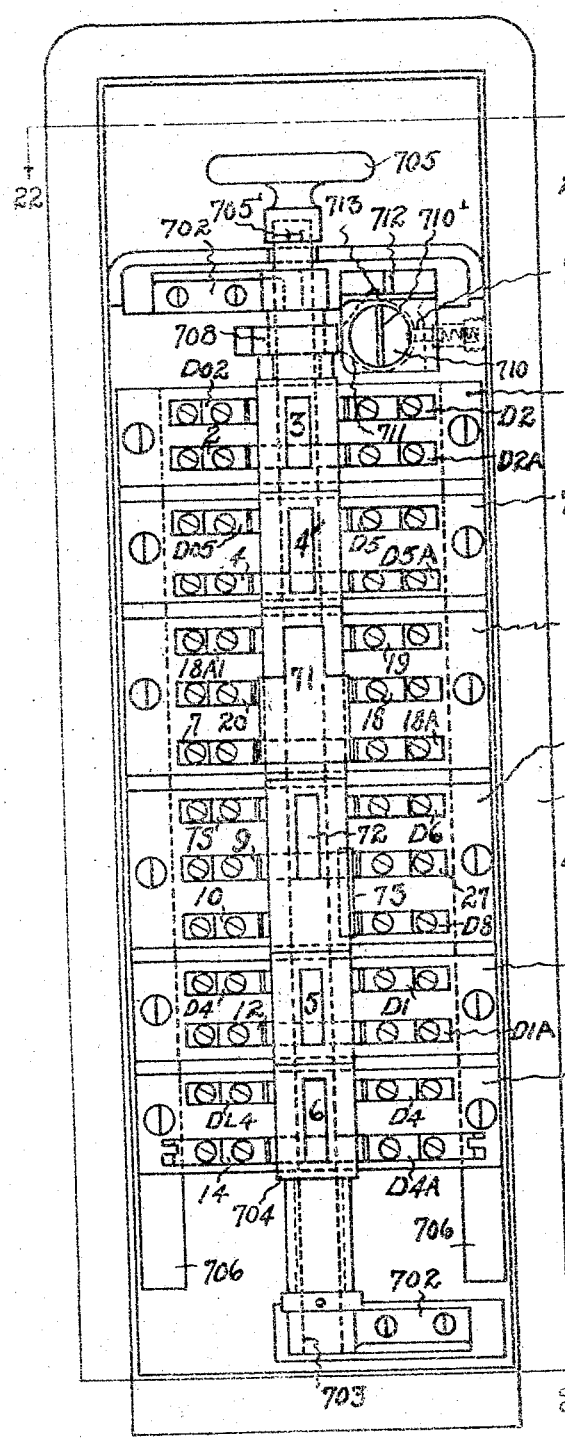
Fig. 21 is a side elevational view of the drum switch with cover removed.
Figure 22:
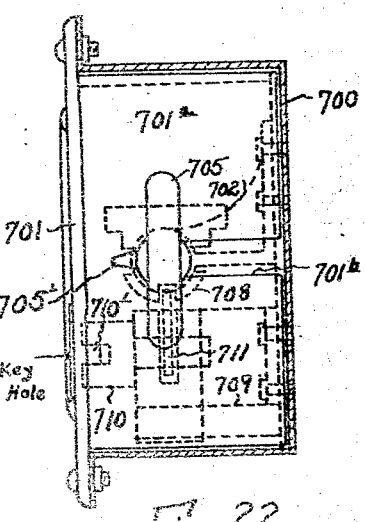
Fig. 22 is a cross-sectional view taken on the line 22—22 of Fig. 21.

The drum switch is shown in Figs. 21 and 22. There are provided, as already described, two of these drum switches on each car, that is, DS1 and DS2 (Figs. 1 and 1—A and 2 and 2—A). The drum switch comprises a suitably formed casing 700 which is provided with a cover 701. This cover does not extend all the way to the top of the casing, but its upper end wall is at 701ª, fitting just under the hub of hand wheel 705. The upper wall 701ª is slitted at 701ᵇ so as to fit around shaft 703. This leaves a small compartment at the top of which the hand wheel is mounted. Mounted within the casing, as shown, are the two bearing brackets 702 in which is journaled a shaft 703. Mounted on this shaft is a drum of insulating material 704 which may be made in sections, as shown, if desired. This drum 704 is secured to the shaft for rotation therewith. The upper end of shaft 703 is provided with the hand wheel 705 by means of which it may be rotated in the supporting brackets 702. The hub of the hand wheel is provided with a pointer 705' to indicate the three settings of the drum switch, namely, "on", "off" and "through". Extending longitudinally within the casing at each side are the supporting bars 706 on which are mounted transversely extending plates of insulating material 707. On these plates are mounted, as shown, so as to bear against the drum, the spring fingers DO2, 2, DO5, 4, 18A1, 20, 7, TS, 9, 10, DL1, D4, 12, DL4, 14, D2, D2A, D5, D5A, 19, 18, 18A, D6, 27, D8, D1, D1A, D4 and D4A. As is clear from the drawings, spring fingers 2 and D2A, 4 and D5A, 7 and 18A, 9 and 27, 12 and D1A, 14 and D4A are permanently connected together by a conducting jumper. Mounted on the drum 704 are the contact bars 3, 4, 71, 72, 73, 5 and 6, which are in the form of rectangular strips. All of these contacts are mounted in alignment with the exception of contact 73 which is around the side of the drum, as shown. Contact 71 is in the form shown and in the position of the drum switch shown, which is the "off" position, interconnects spring fingers 20, 7, 18 and 18A. Secured to shaft 703 is a segmental member 708 which is centrally slotted and provided with similar slots on each side of the central slot and separated therefrom by 90 degrees, as is clear in Fig. 22. Within the casing is a standard 709 which pivotally supports the hub 710 which is provided with a transverse slot 710' thereon. Opposite this slot there is provided a key-hole in the cover 701, so that hub 710 may be rotated by means of the key by authorized persons. Secured to the hub 710 is a latch bolt 711 which cooperates with the segmental member 708. As is clear from this description, shaft 703 and the drum thereon may not be rotated unless the latch bolt 711 is withdrawn from out of contact with the segmental member 708 by the use of a key. When the latch bolt 711 is withdrawn, the drum switch may be rotated in either direction to any of its settings by means of the hand wheel 705. It is locked in any of these positions by rotating hub 710 in the opposite direction to cause the latch bolt 711 to engage the segmental member 708. In rotating the latch bolt in the opposite direction, it is stopped in the proper position by means of the projection 713 thereon which engages the stop 712 (Fig. 21). A spring pressed plunger 712' of the usual type bears upon hub 710 which is provided with three properly spaced depressions so as to hold this hub in any one of its three positions. Looking at Fig. 22, when hand wheel 705 is given a clockwise rotation from the position shown the drum switch is set to "on" position. When it is rotated in a counter-clockwise direction, the drum switch is set in "through" position. When it is in the position shown, the drum switch is set in "off" position. It is not deemed necessary to state in this specification the interconnections between the various spring fingers for these three settings, since this is clearly and completely set forth in Fig. 39. These drum switches are all of the same construction, and the spring fingers thereof have all been given the same symbols so that regardless of how many cars there are in a train and regardless of how many units the train is divided into and regardless of the number of cars in each unit, the same interconnections of spring fingers are effected for the same settings.

*Function of drum switches*

The proper settings of the drum switches are shown in Fig. 39 for a twelve-car train divided into three units of four cars each, with the guard's station midway of each unit. The symbol "guard's division" represents the point beyond which his control of the doors does not extend. A guard's division is made between any two cars by setting the drum switches of the adjacent ends of those cars at "off" position. The guard's station may be between any two cars of any unit. This is accomplished by setting the drum switches on the adjacent ends of those cars in "on" position. All the other drum switches of that unit are set at "through" position. If the unit under discussion is the first or last unit of the car, then the first drum switch in the first instance and the last drum switch in the second instance, are set at "off" position. In other words, on every train the foremost drum switch and the last-most drum switch are set at "off" position. This descriptive matter is illustrated in Fig. 39. With the drum switches set in these positions, the spring fingers are interconnected as set forth in Fig. 39.

*Emergency switches*

Figure 23:
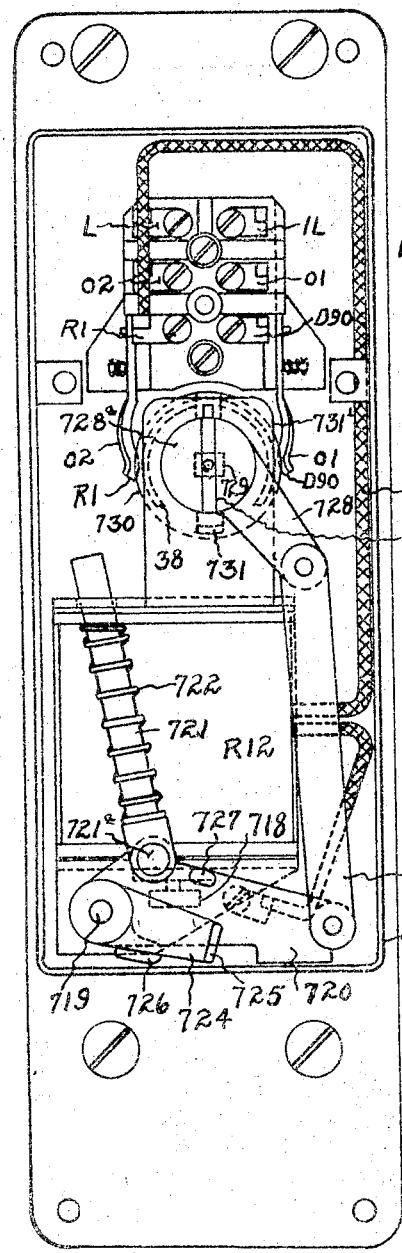
Fig. 23 is a side elevational view of the emergency switch with the cover removed.
Figure 24:
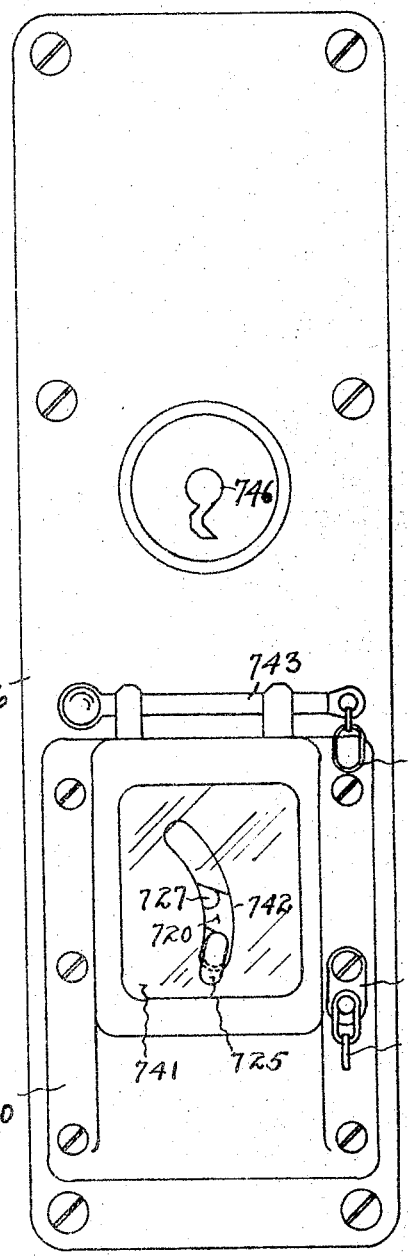
Fig. 24 is a similar view with the cover applied.
Figure 21:
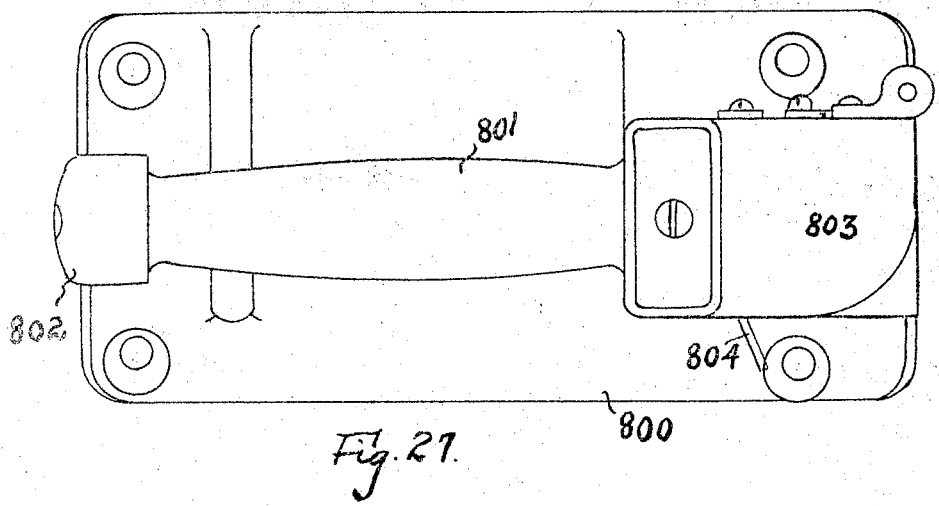

The emergency switches, two of which are provided for each car, are of the same construction and are of the form shown in Figs. 23 and 24. These emergency switches are provided to permit the operation of one end door engine at each end of each car diagonally opposite of each other. The emergency switches may be actuated by an authorized person, such as a train guard or motorman, by the use of a key, when desired, or in an emergency they may be operated by a passenger in a manner which will now be set forth.

The emergency switch comprises a casing 715 which has a cover 716. Within the casing is the solenoid winding R12 provided with plunger 718. When the solenoid winding is energized the plunger moves downwardly. Mounted on and secured to shaft 719 is a lever 720. This lever is pivotally secured at 721$^a$ to rod 721, which extends through an opening in a bracket as shown. Encircling rod 721 is a spring 722 which acts to force the rod 721 and lever 720 into the position in Fig. 23 and to hold it there. Lever 720 is pivotally connected by link 723 to an arm 728 which is secured to a hub 728$^a$ mounted on and secured to a rotatably supported shaft 729. Shaft 729 is journaled in the brackets 731'. Also secured to shaft 719 for rotation therewith is a short lever 726. Lever 724 is rotatably mounted on shaft 719. This lever 724 has a projecting handle 725. A short projection 727 is mounted on lever 720 so as to be in the path of movement of lever 724. When the cover is applied to the device handle 725 projects through an arcuate slot 742 in the cover. The cover 716 is provided with a smaller casing 740 which has an opening closed by a glass window 741. This glass window overlies the opening 742 and handle 725, so that this handle may not be reached unless the glass is broken. Mounted on the casing in suitable clips is a hammer 743 which is secured to the casing by a chain 744 and clamp 745. Cover 716 is also provided with a key-hole 746.

The hub 728$^a$ is provided with a slot 728$^b$ which is in alignment with the key-hole 746 when the cover is in place. Mounted on shaft 729 is a drum of insulating material 730 which supports contacts 37, 38 and 731. The construction of this drum and the contacts is clear from Figs. 25 and 26. Mounted within the casing and above this drum is an insulating support on which are mounted the spring fingers IL, O1, D90, L, O2 and R1 diagrammatically illustrated in Figs. 1 and 1—A. Spring fingers O1 and D90 on the right side of this drum appear in Fig. 23, and spring fingers R1 and O2 appear at the left side. In back of these fingers, one on each side, are the spring fingers L and IL. In other words, on each side of the drum are three spring fingers mounted in alignment. These spring fingers have bent-over portions provided with screws, as shown, to which the proper wires may be connected. As shown, spring finger R1 is connected by wire R11 to one terminal of the solenoid R12, the other terminal being grounded to the casing, as shown. The parts of this emergency switch are shown in Figs. 23 and 24 in their normal position. This so-called normal position is the position which this switch has when the door controlled thereby is closed. At this time spring fingers IL and L are connected by contact 37, and spring fingers O1 and O2 are connected by contact 38. This is clear from Figs. 1 and 1—A.

To open the door an authorized person inserts the proper key in keyhole 746 to engage slot 728$^b$. He turns the key so as to rotate arm 728 in a counter-clockwise direction (Fig. 23). This pulls lever 720 upwardly until pivot pin 721$^a$ swings to the left past the center of shaft 719. Spring 722 then causes the parts to snap over and to hold lever 720 in raised position. Since lever 720 is secured to shaft 719 and lever 726 is also secured thereto, lever 726 also moves with lever 720 so as to engage the end 718 of the plunger. Lever 724 does not move during these operations. This counter-clockwise rotation of lever 728 causes drum 730 to rotate with it, so that spring fingers I1, O1 and D90 are bridged by the contact bar 731 on the bottom of the drum 730 and spring fingers O2 and R1 are interconnected by contact 38. In this position of the emergency switch the doors are caused to open, as will be described later. To return the parts to normal position it is only necessary to energize solenoid R12 as will be described, which causes plunger 718 to move downwardly, carrying with it lever 726, shaft 719 and lever 720, as well as all the parts connected thereto. This moves the switch to door closing position and causes the door to close as will be described later. In an emergency operation of this switch, a passenger breaks the glass 741 with hammer 743, grasps handle 725 and moves it upwardly. The upward movement of lever 724 causes it to engage projection 727 on lever 720, thus carrying the lever with it and all the parts connected thereto. This sets the emergency switch to door opening position. The emergency switch is returned to normal position, as before, by energizing solenoid R12. It will be apparent from the above that the emergency switches will be caused to open and close the door by an authorized person with a proper key, or by a passenger in an emergency by handle 725—the operations effected being the same.

*Master door controller*

Figure 28:
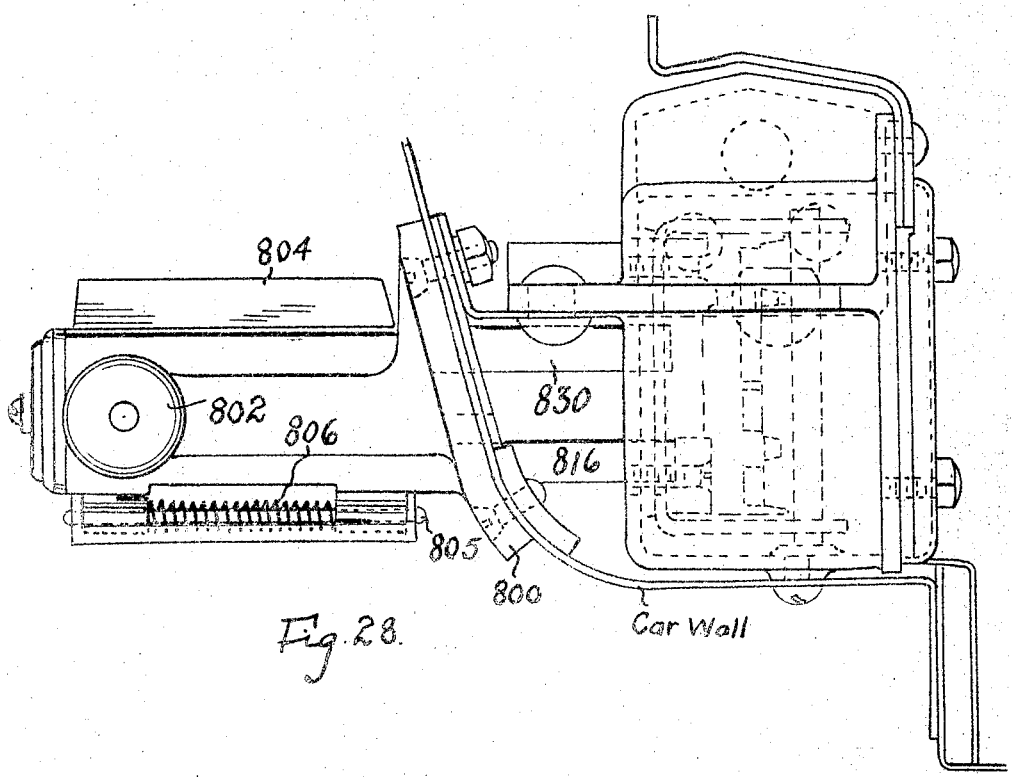
Fig. 28 is a top plan view of the master door controller showing its relation with the car wall and the switch which it operates.

The master door controllers and the switch operated thereby are clearly shown in Figs. 27 to 36, inclusive. As shown in Fig. 28, the master door controller is mounted on the outside of the car wall, one at each end of each car on each side. These controllers are, in fact, mounted on the cars in exactly the same way that similar controllers are at present in extensive use on subway cars. By mounting them in this manner on the outside of the car, the guard may stand between the adjacent ends of two cars at the guard's station and by operating the two adjacent controllers control the doors of the corresponding side of the cars in the unit under his control. The switches operated by the controllers are all the same and one of these is shown in Figs. 35 and 36. The switches are mounted within the car in alignment with the controllers, as shown in Figs. 28 and 29. It might be well to point out that these controllers are made in right-hand and left-hand forms so as to properly fit the sides of the car, but otherwise they are structurally the same. The controllers comprise a plate 800 which is secured to the outside of the car wall and supports a handle 801 to be grasped by the guard. Mounted below the handle is a casing 803 having a hinged cover 804 thereon which is mounted on a pivot pin 805 and held normally in closed position by a spring 806. The handle 801 has a bore therethrough in which is slidably mounted a rod 807. The upper end of this rod is secured to a cap or push button 802. The rod and cap are held in raised position by a spring 802′, which position is the normal position of these parts as shown in Fig. 29. Within casing 803 are the triggers 808 and 810 rotatably mounted on the transverse shafts 809 and 811. Trigger 808 has an upwardly projecting arm 812 and trigger 810 has an upwardly projecting arm 814. These triggers also have lugs 815 and 813, respectively. There are two lugs 813, as is clear, in Figs. 31 and 32. The projecting arms 812 and 814 engage and operate slidable rods 816 and 830, respectively (see Fig. 31). The construction of these rods is shown in Figs. 33 and 34. Rods 816 has a notch 816$^a$ on one face and a notch 816$^b$ at right angles thereto on another face. The projecting wing 812 engages notch 816$^b$ of rod 816. Rod 830 has a single notch 830$^a$ which is as long as the combined length of notches 816$^a$ and 816$^b$. Referring to Fig. 29, it will be noted that the projections 813 on trigger 810 contact with the lower surface of rod 816 (see also Fig. 31). These projections prevent the movement of trigger 810 in either direction in the normal position of rod 816, which is the position shown in these figures. Likewise, projection 815 on trigger 808 contacts with the lower surface of rod 830 permitting its movement in one direction only, namely, to the right (Fig. 29).

The switch operated by the master door controller will now be described in connection with Figs. 35 and 36. The switch comprises a frame 819 having a transverse shaft 820 mounted therein. Mounted on this shaft by means of collars are two pairs of arms 821. These collars interlock each other by overlapping lugs formed, as shown by line 900. The collars are free to rotate on shaft 20. The switch is shown in these figures in normal position or door closed position with the switches open. Arms 821 support the pins 822, on which are pivotally mounted rods 824 extending through holes in the frame. These rods are encircled by compression springs which abut against the frame. On the other side of each collar is an arm which supports a block of insulating material 826. Fulcrumed on these blocks of insulating material are the switch blades A1 and A2. They are held in place by means of pins 826$^b$ and are permitted to move against the reaction of spring 826$^a$. As clearly shown in Fig. 35, when pressure is applied to the outer end of switch blades A1 and A2 they may move about their rear edges against the reaction of springs 826$^a$. Also mounted on the frame is a block of insulating material 827 which supports four contacts—DL2, D81, D82 and DO3. Contacts D81 and D82 are permanently bridged by the connecting bar D83. The rods 816 and 830 are pivotally connected to the switches to operate them by means of the adjustable connecting members 831 and 823 which engage the pins 822 (see Fig. 31). By reason of the interlocked relation of the collars, switch blade A1 is moved first, then switch A2 is moved. Both of these switch blades move simultaneously in the reverse direction because, as will be explained, the force for returning them being applied to the arms 821, which operates switch blade A1, also causes switch blade A2 to move that switch blade A1 because of the interlocking connection indicated at 900.

When a guard wishes to open the doors, he must first unlock them. To do this he swings cover 804 downwardly, exposing triggers 808 and 810. He moves trigger 808 to the right (Fig. 29). He cannot in the normal position of the apparatus operate trigger 810 in either direction, as already stated. This movement of trigger 808 causes rod 816 to move downwardly (Fig. 31) through the agency of wing 812. This pushes on levers 821 connected to that rod, causing them to move to the left (Fig. 29). When the point of pivotal connection 822 passes the center, spring 825 causes arms 821 to move further to the left, causing switch blade A1 to engage contacts DL2 and D81. Spring 825 holds these parts in operated position. As will be explained, the closing of this switch energizes magnet valves 30, 21 and 32 on the side of the train corresponding to the controller operated. The operation of the magnet valve delivers air to the lock cylinder causing the doors to be unlocked. The guard then pulls trigger 810 to the right (Fig. 29). He can now pull trigger 810 to the right because notch 816$^a$ is directly over the projections 813 on this trigger. The movement of this trigger causes rod 830 to move downwardly (Fig. 31). This causes switch blade A2 to interconnect contacts D82 and DO3 in the same manner that switch blade A1 interconnects its contact. The other spring 825 maintains switch blade A2 in this operated position. At this time the overlapping lugs of the collars of arms 821 are again in the position shown in Fig. 36, it being remembered that they move apart upon the first operation of moving switch blade A1. This operation of switch blade A2 energizes magnet valves 13, 34 and 35 on the same side of the car, causing the engines to operate to open the doors. When the passageways are clear the guard, in order to close and lock the doors, has merely to depress button 802, pushing rod 807 downwardly (Fig. 29). It is to be remembered that trigger 808 is pulled to the right, so that it is in a substantially horizontal position when it is operated and it remains in that position. The downward movement of rod 807 causes it to push trigger 808 downwardly. Wing 812 then pulls rod 816 back to its normal position or upwardly in Fig. 31. This movement of rod 816 pulls switch blade A1 back to normal position through the connections as described, and the movement of this switch blade causes the simultaneous movement of switch blade A2 because of the interconnected collars, as pointed out. The reverse movement of switch blade A2 also causes rod 830 to return to normal position and all the connected apparatus is maintained in normal position (Fig. 29) by the springs 825. The apparatus is now set for operation again, the doors having been closed and locked as will be described later.

In Fig. 40 is shown diagrammatically and in a simplified manner how all of the engines are operated, regardless of whether they are end door engines or center door engines. The fluid pressure supply source is shown at 900 and is connected by pipe 119$^d$ to the large cylinder head 119. Actually, this pipe is connected into the coupling nipple 119$^a$ (Figs. 4 and 14). The fluid pressure from this pipe travels across the head through passage 401 (Fig. 11) into pipe 123 up to magnet valve 30. It also travels straight through pipe 121 into small cylinder 116. Fluid pressure is always on the small cylinder 116, as is usual in differential engines. When the first trigger is operated, as already pointed out, switch blade A1 interconnects contacts DL2 and D82. Current flows from wire D84 through wire D83, contacts D82, switch blade A1, contact DL2 and through wire 1000 to and through the winding of magnet valve 30 to ground. It is, of course, apparent that wire 1000 in this figure does not correspond to the corresponding connection in Figs. 1 and 1—A, but since this is a simplified drawing they need not necessarily correspond. In the actual circuit, as shown in Figs. 1 and 1—A, the current must, of course, go through a number of instrumentalities before reaching the magnet valve. The energization of magnet valve 30 causes it to operate so that fluid pressure flows from pipe 123 to the lock cylinder 145, causing it to operate lever 147. When the next trigger is operated switch blade A2 interconnects contacts D81 and DO3. Current then flows through wire D84, wire D83, contact D81, switch blade A2, contact DO3, wire 999 to the winding of magnet valve 13 and thence to ground. As before, this wire 999 is a simplified representation of the wires through which the current must flow in the actual circuit to reach the magnet valve. It is to be remembered that when the differential engine and the doors are closed, fluid pressure is continuously supplied to the large cylinder. To open the doors, fluid pressure must be exhausted from the large cylinder so that the continuous pressure in the small cylinder will cause the doors to open. Therefore, the energization of magnet valve 13 cuts off the fluid pressure supply to large cylinder 118 and permits the pressure therein to exhaust the atmosphere through 13$^a$. As a result the door is opened. When the doors are to be closed, both switch blades A1 and A2 are simultaneously moved away from their contacts, deenergizing both magnet valves. The doors are closed and the lock cylinder is open to exhaust, so that the locking mechanism is free to lock the doors at the proper time.

*Operation of the locks and motors*

The operation of the apparatus and control circuits for the door locks and door motors will now be described in detail. In order to fully understand the operation of the circuits, it is necessary to consider more than one car since, when a number of cars are connected into a train, the various drum switches must be properly set to effect continuity of circuits from car to car at the desired points as determined by the guards' divisions and the guards' stations. In order to follow these circuits through, it will be necessary to keep Fig. 39 in mind, which is the key to the drum switch settings at the ends of the cars and the interconnections between the spring fingers on the drum switches.

Although a twelve-car train has been illustrated, divided into three units by two guards' division points with each unit comprising four cars divided into groups of two by guards' stations, it will only be necessary to follow the circuits through in one unit to fully understand the complete operation of all the circuits on such a train. In following these circuits through, since the circuits for one car only have been illustrated in detail it will be necessary to follow the circuits through from one end of the car to the other and then return to the first end and trace them through again with the proper drum switch settings, in order to understand the circuits for more than one car when connected into a train. In other words, the same car circuits will be used more than once with the reader keeping in mind, of course, that the circuits for several cars connected end to end are being described.

At the guards' divisions in a train, the drum switches on the abutting ends of the cars at the division point are in "off" position. The contacts which are made are set forth in Fig. 39. As far as the lock circuits and the motor operating circuits are concerned, the "off" settings of the drum switches isolate the circuits of the units. There is a guard's station on each unit and at his station the drum switches are set at "on" position, and the contacts made at the drum switches for that setting are set forth in Fig. 39. At each end of the train the drum switches are set in "off" position. At all other points or ends of the cars in the train the drum switches are set in "through" position, and the contacts which are made are all set forth in Figs. 39.

It is assumed, as indicated by the arrow in Fig. 39, that the train is moving from left to right so that the extreme right-hand end of the train is the head end at which the motorman is stationed. The guard, as is usual, when he controls the doors stands between the adjacent ends of the two middle cars of each unit. The description of the circuits will be confined to the head end unit. When the doors are closed, it will be remembered, fluid pressure is supplied to the larger cylinder of the engine through magnet valves 13, 34 and 35. Magnet valves 30, 21 and 32 have cut off the supply of fluid pressure to the door lock cylinders 145. When the train pulls into a station the guard stations himself at the guard's station. Current is on the circuits from the positive side of the current source (Fig. 2—A) through wire 102, switch 101, fuse 100, wires 99, 80, D8A. As already pointed out, wire D8A in Fig. 1 is always connected to wire D8A which runs through the car and is shown in Figs. 2 and 2—A. Returning to Fig. 1, current flows through wire D8A, D88 to wire D84. To unlock the doors the guard causes switch blade A3 to bridge contacts DL6 and D86. This is effected by pulling trigger 808, as above described in detail in connection with the master door controller construction. Current then flows from wire D84 through wire D85, contact D86, switch blade A3, contact DL6, wire DL5 to spring finger DL4. At the guard's station the drum switch DS1 is in "on" position. Thus, spring finger DL4 is connected to spring finger 14 through contact 6. Current then flows through the jumper connection to spring finger D4A and thence to wires D4A2, D4A1 and D4A3. This causes magnet valves 30 and 21 to be energized. Magnet valve 32 is energized by current flowing through wire D4A3 (Fig. 1—A) through wire L1, spring finger L, contact 37, spring finger 1L and wire 1L1. The energization of these magnet valves causes fluid pressure to be supplied to the lock cylinders 145 in the manner already described (Fig. 40). As a result the latch levers 153 for the end door engines and the latch bar 157 for the center door engines are withdrawn. Their same movement opens the motor switches 60, as has also been described. It may be well to point out, with respect to Fig. 39, that the guards are controlling the doors on the right-hand side of the train with respect to its direction of travel. The circuits just described will be assumed on the second car from the forward end of the train. Current flows on through wire D4A1 to spring finger D4A on drum switch DS2 which is in "through" position (Fig. 39). In this position spring finger D4A is connected to spring finger D4. These two spring fingers are bridged by contact 40. Current thus flows through wire D11 through the jumper connection into the next car, which is the first car on the train.

Now returning to the rear end of the car shown in Figs. 1 and 1—A assuming it is the next car or the first car on the train, current flows through the jumper connection into wire D11 to spring finger D4. Drum switch DS1 on this car is in "through" position. Current flows through contact 6, spring finger D4A and thence to wires D4A2, D4A1 and D4A3, energizing magnet valves 30, 21 and 32 as before. Since drum switch DS2, which is at the head end of the train, is in "off" position, wire D4A1 terminates at spring finger D4A. The doors are thus unlocked on the right-hand side of the first two cars of the head end unit.

In a similar manner the guard pulls trigger 808 on the head end of the third car of the unit, causing all the doors to be unlocked on the last two cars of that unit in the same way as described with the first two cars. In a similar manner the other guards unlock all the doors on the right-hand side of their units. It might be well to point out, as is no doubt already clear, that each guard has complete control of all the doors of his unit independently of the other guards. Returning now to the head end unit the guard, having unlocked the doors, next pulls trigger 810 causing switch blade A4 to bridge contacts D87 and DO6.

It is to be remembered that there are four master door controllers on each car, two at each end there being one on each side. Hence to operate the locks and doors on the right-hand side of the train, the guard will operate master controller MC2 in the lower left-hand corner of Fig. 1. Current then flows from wire D84 through wire D85, contact D87, switch blade A4, contact DO6, wire DO4 to spring finger DO5. Drum switch DS1 is, of course, in "on" position so that spring fingers DO5 and 4' are connected by contact 4. Spring finger 4 is connected by a jumper to spring finger D5A which, in turn, is connected to wires D5A1, D5A2 and O21. As a result, magnet valves 13 and 34 are in circuit through snap switches 16. Wire D5A1 is connected by wire O21 to magnet valve 35 through spring finger O2, contact 38, spring finger O1, wire O11 and snap switch 16. In a similar manner the magnet valves 13, 34 and 35 are energized on the next car, which is the head end car. Current flows through wire D5A1 to spring finger D5A. Drum switch DS2 is in "through" position so that spring finger D5A is connected to spring finger D5 by contact 42.

Current thus flows through wire D21, through the jumper connection to wire D21 on the next car. Wire D21 is connected to spring finger D5 on drum switch DS1 at the rear end of this car. Spring finger D5 is connected to spring finger D5A by contact 4′ of this drum switch, which is in "through" position. Current then flows to wires D5A1, D5A2 and O21, as before. Wire D5A1 terminates at spring finger D5A of the head end drum switch DS2 which is in "off" position. Thus, as already described, magnet valves 13, 34 and 35 are energized, cutting off the fluid pressure supply to the large cylinders of the engine and opening them to exhaust. Fluid pressure supply being constantly on the smaller cylinders of each engine, the doors are opened by the operation of the motors, as already described. These same operations, of course, occur for the last two cars of the same unit, and likewise the guards on the other units open all the doors on the cars of their units.

When all the passengers have alighted and boarded the train so that the passageway is clear, each guard presses the button 802 on each of the master door controllers at his station. This causes the switch blades A3 and A4 of each of his controllers to move out of contact with their corresponding contacts. As a result all of the magnet valves 13, 30, 34, 32, 21 and 35 are deenergized. The deenergization of magnet valves 30, 21 and 32 cuts off fluid pressure supply to the lock cylinders and opens them to exhaust. The springs in these lock cylinders return the pistons to normal position, putting the spring connections 146 (Figs. 4 and 20) under tension. The deenergization of magnet valves 13, 34 and 35 cuts off the exhaust connection of the larger cylinders of each engine and supplies fluid pressure to them. As a result the doors are moved to closed position.

In the case of the end door engines, the end doors are locked when bracket 143 engages bolt 139 (Fig. 4) withdrawing rod 137′ so as to release the latch levers 153. In the case of the center door engines, the latch bars 157 move to locking position when the pin on arm 127′ (Fig. 18) engages arm 452 to cause arm 453 to move out of engagement with the latch bars 157. Thus the doors close and lock. When the doors are locked motor switches 60 close, completing signal circuits which will be described below.

The forward end door of each car may be opened in two ways in an emergency. Firstly, by a guard with the proper key which he inserts in the key-hole 746 on the emergency switch casing (see Fig. 24). As already described, this key rotates drum 730 (Fig. 1—A) so that contact 38 bridges spring fingers O2 and R1, and contact 731 (Fig. 26) bridges spring fingers 1L, O1 and D90. As a result current flows from wire D8A to spring finger 90, contact 731, spring finger O1 and wire O11 to magnet valve 35 and spring finger 1L, wire 1L1 and magnet valve 32. As a result the end door is unlocked and opened. The drum of this emergency switch ES2 may also also be operated by a passenger by breaking glass 741 (Fig. 24) and pushing up on handle 725. The drum switch remains in operated position when operated either by a key or by the handle. To return this switch to normal position, the guard may rotate the drum back by means of the key, or he may energize the winding R12, which is now connected to wire D5A1, by wire O21, spring finger O2, contact 38, spring finger R1 and wire R11. Current is supplied to wire D5A1 by the guard causing switch arm A4 to bridge its contacts D87 and DO6 at the guard's station. As before, current also flows to the next car through wire D5A1, energizing the magnet R12 on that car so that if that emergency switch has been operated it will also be returned to normal position.

*Operation of the signal circuits*

With the doors closed and locked the motor switches 60 are all closed, so that the series circuit including these motor switches is completed. Current then flows through wire 102, switch 101, fuse 100, wire 99 to contact 60″ (Fig. 2—A), through switch 60, contact 60′, wire 69, the next switch 60, wire 68, the next switch 60, wire 67, the next switch 60, wire 66, the next switch 60, wire 61, the next switch 60, wire 62, the next switch 60, wire 63, the next switch 60, wire 64, the next switch 60, wire 65, the next switch 60, wire 95 and through the magnet winding 94 to ground. This causes switch blades 90 and 91 to engage their contacts and switch blade 87 to disengage its contact 89. It will be apparent that winding 94 will not be energized until all the doors are both closed and locked. If closed and locked, winding 94 will be energized. When any door is unlocked, winding 94 is not energized and switch blade 87 engages contact 89 so that current flows from the positive side of the current source through wire 88, switch blade 87, wire 86 to wire 83 and signal lamps 84″ and 85 on the outside of each car. Thus, these lights will be lit giving a signal to the guard or motorman when he looks down towards the side of the train that one or more doors are either opened or unlocked or closed and unlocked. At the same time, the guard's signal light circuit including wire 27A, and the motorman's signal light circuit including wire 211 will be broken so that proceed signals cannot be given. However, when winding 94 is energized, the doors being locked, lights 84″ and 85 are extinguished and the motorman's and guard's signal light circuits will be completed at switch blades 90 and 91. It will be remembered that at the motorman's station at the head end of the train, the contacts in the master controller which controls the train will be arranged if the train is going forward so that contact 103 interconnects wires 97 and 105. If he is going backward contact 104 likewise interconnects wires 97 and 105. At all the other points on the train, these contacts will be arranged so that contact 98 interconnects wires 99 and 97. Thus the signal lamps 106 and 54′ at the ends of all the other cars will be permanently out of circuit since the controlling contacts and the master controller are in neutral position. When the train is standing still the same will be true of these contacts and the master controller at the head end of the train. Coupler switch 96 at the head end of the train will be closed, since there are no cars coupled ahead of this train. Coupler switch 44 at the rear end of this car and all the coupler switches at each one of all the other cars will be opened, since these cars are coupled to other cars. Of course, the last coupler switch at the rear end of the last car will likewise be closed. Reviewing then the conditions with respect to these parts at the head end of the train at the motorman's station, it is pointed out that coupler switch 96 is closed and contact 98 interconnects wires 99 and 97, with the result that current is supplied to wire 211 through wire 99, contact 98, wire 97 and coupler switch 96. It will be remembered that on each car this wire 211 passes through switch 90 controlled by winding 94. Wire 211 can be traced straight through the train jumping around the drum switches, but in passing through each car it must pass through this switch 90. This switch 90 is only closed on each car when the magnet winding 94 on each car is energized, which, it will be remembered, only occurs when all the doors on that car are closed and locked. Thus when all the doors on the whole train are locked and the motorman has moved his controller, either forwardly or rearwardly, so that contacts 103 or 104, respectively, connect wire 105 to wire 97, current will get from wire 211 in the forward car to motorman's signal lamps 106, giving him a signal to proceed. The motorman normally moves his reverse handle ahead, if he is going forward, and it stays there so that contact 103 interconnects wires 97 and 105, so that as soon as all the doors are locked he gets his signal to proceed and can then advance his controller handle to supply current to the driving motors in the usual manner. The same remarks apply if the motorman is going to drive the train backward.

The buzzer 108 at the head end of the train adjacent the motorman's station is provided as a signal auxiliary to signal lamps 106. Thus if there is anything wrong with these signal lamps so that they do not light when all the doors are closed and locked, the guards may signal with the buzzer for the motorman to proceed. The guards, of course, get their signal that the doors are locked by observing whether all the lamps 84″ and 85 are extinguished. Of course, in normal practice the guards do not have to look at the lights on the left-hand side of the train, since these doors are closed and locked when the train is proceeding to the right and are never operated.

All the signal lamps 85 on the right-hand side of the train can only be extinguished when all the doors are locked so that winding 94 is energized, as pointed out before. When this occurs the guard on the forwardmost unit of the train may signal to the motorman to proceed, or he may wait until the other guards to the rear of him signal up to him to proceed. The circuits on each unit are the same so that they will only be described for one unit. The guard depresses push button 50 at his station. Current flows from wire D8A to which it is always being supplied, through wire 52, wire 49, push button 50, wire 51, to spring finger 18A1. The drum switch DS1, it will be remembered, at his station he sets at "on" position. Thus, spring fingers 18A1, 20 and 7 are bridged by contact 71. Current thus reaches buzzer 56 at his station through wire 55, giving him a signal that the buzzer circuits are all right. Current also flows through spring finger 7 to spring finger 18A through the jumper connection and thence to 18A1′, which is connected to spring finger 18A on drum switch DS2. This drum switch, it will be remembered, is in "through" position so that spring finger 18A is connected to spring fingers 18 and 19 by contact 76. Current then flows from spring finger 18 through wire 181, through the jumper connection to wire 181 in the next car through spring finger 18, contact 71 of drum switch DS1, which is in "through" position, to spring finger 18A and thence to wire 18A1′. Wire 18A1′ is connected to spring finger 18A of the head end drum switch DS2. Spring finger 18A is connected to spring fingers 18, 20 and 7 by contact 76, this drum switch being in "off" position. As a result, current flows through wire 107 to buzzer 108, giving the motorman a signal to proceed. The guards at each of the units may signal forward from one unit to the next, so that the signal may be advanced from the rear end of the train to the motorman by signalling one guard after another. To do this the signal current must get from one unit to the next, or from one guard's position to the next guard's station. This is accomplished because at the guards' divisions the drum switches are in "off" position, so that wires 181, which are connected through the jumper connection at the guard's division, terminate at spring finger 18 of each of these switches. Spring finger 18 is connected to spring finger 18A by contact 74, so that current flows through wire 18A1' and spring finger 18A through the jumper connection to spring finger 7, contact 76, spring finger 20, wire 107 and buzzer 108 which, in this case, is the buzzer at the guard's station. It will be remembered that the drum switches at the guard's station are in "on" position. Thus the signal is advanced from unit to unit through the guard's division to the guard's station, so that each guard may repeat the signal until the motorman gets that signal.

The motorman may also signal back to the guards if he has occasion to do so through the same circuits by pressing push button 84' at his position, so that wire 18A1' receives current from wire 99 through wires 84 and 82. In other words, push button 84' is in parallel with push button 50 and controls the same signal circuit so that the buzzers may be operated by either push button.

In addition to getting a signal that all the doors are closed and locked by observing signal lamp 85, the guard may also, and generally preferably, gets that signal by observing the signal lamps 110 and 58 adjacent his position. These lamps are energized through switch 91 when all the doors are locked. As pointed out before, winding 94 is energized and switch 91 is closed when all the doors are closed and locked. This occurs on each car and current flows on each car from wire 99 through wire 80 to spring finger D8. On drum switch DS2 at the head end of the train this spring finger is connected to spring finger 27 by contact 75, the drum switch being in "off" position. Current thus flows on through wire 92, switch 91 and wire 27A to spring finger 27 on drum switch DS1 at the rear end of the car. Spring finger 27 is connected to spring finger D6 by contact 72, this drum switch being in "through" position. Current then flows through wire D61 through the jumper connection into the forward end of the next car. From wire D61 current flows to spring finger D6, which is connected to spring finger 27 by contact 74, this drum switch being in "through" position. Current then flows through wire 92, switch 91, wire 27A to contact 27. Spring finger 27 is connected by a jumper to spring finger 9 which, in turn, is connected to spring finger TS by contact 72 on drum switch DS1, which is in "on" position at the guard's station. As a result, signal lamp 58 is energized through wire 57. In the same way this guard gets a signal for the other two cars of his unit, and the guards of each of the other units gets a signal of each half of his unit. The guards are thus automatically signaled when the doors are locked by these signal lamps, two for each guard's station, so that in case the motorman's signal lamp 106 does not operate for any reason the guards will have authorization to signal through by means of the buzzers to the motorman to proceed.

It may again be mentioned that the snap switches 16 are normally arranged so that the motor switches 60 control the signal light circuits, and the motor controlling magnet valves are connected in circuit. If, for any reason, it is desired to cut a motor out of circuit so that its door or doors will not be operated, it is only necessary to turn the snap switch on that motor to its other setting. In that case, the magnet valve of that motor is cut out of circuit and the motor switch is short circuited so that the signal circuit at that point will always be complete.

It will be apparent from the foregoing detailed disclosure that this invention involves certain principles of construction and operation embodying only one physical form for purposes of illustration. Those skilled in the art will immediately appreciate that these principles of construction and operation may be embodied in other physical forms without departure from this invention, and I do not therefore desire to be strictly limited to the disclosure as given for illustration, but rather to the scope of the invention as it has been defined in the appended claims.

What I desire to secure by United States Letters Patent is:

1. In a door lock and door control system, the combination with a movable door, means for operating said door, means for locking said door in closed position, and a master controller for said door operating means and door locking means including mechanically interconnected, manually actuable elements for actuating the door locking means and then actuating the door operating means in sequence in opening the door and incapable of actuation in reverse sequence.

2. In a door lock and door control system, the combination with a movable door, means for operating said door, means for locking said door in closed position, a master controller for said door operating means and door locking means including actuable, mechanically interconnected elements for first actuating the door locking means and then actuating the door operating means in sequence, and a single mechanical means for simultaneously actuating both of said means to cause the door to close and then to lock in sequence.

3. In a door locking and actuating system, the combination comprising a movable door, a motive device for moving the door, a lock for locking the door, control means for controlling the motive device and independent means for controlling the lock and including mechanical interlocks only actuable to first control the operation of the lock and then the motive device to open the door, and actuable only to control the operation of the motive device to close the door, and means mounted in the path of the door to be engaged thereby for moving the lock into locking position when the door is substantially closed.

4. In a door locking and operating system, the combination comprising a movable door, an electrically controlled motive device for operating the door, electrically controlled locking means for locking the door in closed position, a master controller for the motive device and locking means, and circuits connecting the master controller and the electrically controlled motive device and electrically controlled locking means, said master controller including interlocked manually actuable elements whereby the motive control is only operable after the locking control has been actuated when opening the door, and manual means for simultaneously actuating the said elements in the opposite direction to cause the motive device to close the door.

5. In a door locking and operating system, the combination comprising a movable door, an electrically controlled motive device for operating the door, electrically controlled locking means for locking the door in closed position, a master controller for the motive device, locking means and circuits connecting the master controller and the electrically controlled motive device and electrically controlled locking means, said master controller including interrelated elements whereby the motive control is only operable after the locking control has been actuated when opening the door, retaining means for holding the locking means in non-locking position when actuated, and means for simultaneously actuating the said interrelated elements in the opposite direction to cause the motive device to close the door, said retaining means being engaged by the door for releasing the locking means when the door is substantially closed.

6. In a vehicle door locking and actuating system, the combination comprising a vehicle having a plurality of doors on each side thereof, said doors each comprising two oppositely slidable sections, a motive device for operating the last section of each door, motive devices for operating the remaining adjacent sections of adjacent doors, and means connected to all of said motive devices for operating all of the sections of all the doors on one side of the vehicle from a single control point.

7. In a vehicle door locking and actuating system, the combination comprising a vehicle having a plurality of doors on each side thereof, said doors each comprising two oppositely slidable sections, a motive device for operating the last section of each door, motive devices for operating the remaining adjacent sections of adjacent doors, locks for locking all of the sections of all the doors in closed position, and control means at a single point for first controlling the locking means and then controlling the motive devices for all the doors on one side of the vehicle.

8. In a vehicle door locking and actuating system, the combination comprising a vehicle having a plurality of doors on each side thereof, said doors each comprising two oppositely slidable sections, a motive device for operating the last section of each door, motive devices for operating the remaining adjacent sections of adjacent doors, and control means at each end and on each side of the vehicle and connected to the locks and the door operating means for first controlling the locks to unlock the doors and then controlling the motive devices to open the doors from either end of the vehicle and on the side corresponding to the doors it is desired to operated.

9. In a vehicle door locking and operating system, the combination comprising a vehicle having a plurality of doors on each side thereof, electrically controlled motive devices for actuating the doors, electrically controlled locking means for locking the doors in closed position, and circuits for said electrically controlled motive devices and said electrically controlled locking means including interrelated individual control devices, the control device for the motive device being actuable only after the control device for the locking means has been actuated.

10. In a door locking and operating system, the combination comprising a movable door, a compressed air motor for operating the door, a fluid pressure supply connected to said motor, electro-magnetic means in the connection for controlling the supply and exhaust of fluid pressure to the motor, a fluid pressure actuated locking means for locking the door in closed position, an electro-magnet valve connected to said locking means and said fluid pressure supply source for supplying fluid pressure to the locking means and for opening it to exhaust, circuits for said electro-magnet valves, and interrelated switches in said circuits arranged so that circuits of the electro-magnet valve for the lock must first be closed before the electro-magnet valve for the motor may be actuated so that the door is unlocked before it can be opened.

11. In a door locking and actuating system for a train comprising a plurality of cars, the combination comprising a plurality of cars connected to form a train, doors on each of said cars, electrically controlled motive means for actuating the doors, electrically controlled locking means for locking the doors in closed position, circuits on each of the cars for said electrically controlled motive means and said electrically controlled locking means, control means in said circuit on each of said cars for controlling said motive means and locking means, interrelated elements in said control means whereby the control of the locking means is operated before the control of the motor means can be operated, means for connecting the circuits of one car to the corresponding circuits of the next car, and switches on each car for dividing the continuous circuits of the train as formed by the means for connecting the circuits of the adjacent cars in any desired manner so that the motive devices and the locking means for any desired number of cars may be controlled at a single point by the controlling means at that point.

12. In a door locking and actuating system for doors comprising a plurality of cars, the combination comprising a plurality of cars, each having a plurality of doors thereon, means for operating the doors, means for locking the doors, control means on each car connected to the means for operating the doors and locking the doors on that car, said connections extending throughout the train, and means on each car at each end for arranging said connections to divide the train with respect to door operation and locking into a plurality of units comprising a plurality of cars, the control means on the cars at the division points controlling the door operating and locking means for all the doors of the unit which includes the division point.

13. In a door operating and locking system for a train, the combination comprising a train made up of a plurality of cars, a plurality of doors on each car, means for actuating the doors on each car, means for locking the doors on each car, control circuits for both of said means on each car normally connected together in a train to provide continuous circuits, and means on each car and connected in said circuits for dividing the continuous circuits of the train to provide isolated sections corresponding to a plurality of train units comprising a plurality of cars.

14. In a system of the type described, the combination comprising a train made up of a plurality of cars, doors on each of said cars, electrically controlled means for operating the doors, electrically controlled means for locking the doors when closed, signal devices on each car, circuits for the electrically controlled door operating means, the electrically controlled door locking means and the signal devices, said circuits being interconnected on adjacent cars of the train, and means on each car and connected in said circuits whereby a plurality of independent control points for the circuits may be established so that all the doors, locks and signals in any desired plurality of cars may be actuated from a single control point.

15. In a door operating and locking system for vehicles, the combination comprising a vehicle, a plurality of doors on said vehicle, a plurality of electrically controlled means for operating the doors, electrically controlled means for locking the doors when closed, circuits for all of the electrically controlled motive devices and the electrically controlled locking means including a single switch having interrelated elements, one for controlling of the locking means and one for controlling of the motive devices, and additional means in said circuits for actuating the locking means and motive device for one of the doors independently of said control means for unlocking and opening operations only.

16. In a door operating and locking system for vehicles, the combination comprising a vehicle, a plurality of doors on said vehicle, a plurality of electrically controlled means for operating the doors, electrically controlled means for locking the doors when closed, circuits for all of the electrically controlled motive devices and the electrically controlled locking means including a single switch having interrelated elements, one for controlling of the locking means and one for controlling of the motive devices, additional means in said circuits for actuating the locking means and motive device for one of the doors independently of said control means for unlocking and opening operations only, and electrical means in said circuits and connected to said additional means for returning the additional means from actuated position to normal position, said electrical means being under the control of said control means.

17. In a door locking and actuating system for doors comprising a plurality of cars, the combination comprising a plurality of cars, each having a plurality of doors thereon, means for operating the doors, means for locking the doors, control means including interrelated elements on each car connected to the means for operating the doors and locking the doors on that car in the sequence named, said connections extending throughout the train, and means on each car at each end for arranging said connections to divide the train with respect to door operation and locking into a plurality of units comprising a plurality of cars, the control means on the cars at the division points controlling in the sequence named the door operating and locking means for all the doors of the unit which includes the division point.

18. In a door operating and locking system for a train, the combination comprising a train made up of a plurality of cars, a plurality of doors on each car, means for actuating the doors on each car, means for locking the doors on each car, control circuits for both of said means on each car normally connected together in a train to provide continuous circuits, means on each car and connected in said circuits for dividing the continuous circuits of the train to provide isolated sections corresponding to a plurality of train units comprising a plurality of cars, and master controllers in the circuits having interrelated elements for coincidently and sequentially operating door locking and actuating means.

19. In a door lock and door control system, the combination with a movable door, means for operating said door, means for locking said door in closed position, means for controlling the operation of the door, independent means for controlling the unlocking of the lock, interlocking means for preventing the actuation of the door controlling means until after the actuation of the control of the door unlocking means, and emergency means connected to the means for operating and locking the door for unlocking the door and opening it independently of said means for controlling the operation of lock means and door operating means.

20. In a door locking and actuating system, the combination comprising a movable door, a motive device for moving the door, a lock for locking the door, a control device for controlling the motive device, a control device for controlling the lock, and independent mechanically interlocked actuating means for said control devices whereby the door must be unlocked before the motive device is actuated.

21. In a vehicle door locking and operating system, the combination comprising a vehicle having a plurality of doors on each side thereof, electrically controlled motive devices for actuating the doors, electrically controlled locking means for locking the doors in closed position, and circuits for said electrically controlled motive devices and said electrically controlled locking means including interrelated individual control devices, a switch for controlling the motive devices, a switch for controlling the locking means, and interlocked mechanical means for preventing the actuation of the switch for controlling the motive devices before the switch for controlling the locking means is actuated.

22. In a door locking and operating system, the combination comprising a movable door, a compressed air motor for operating the door, a fluid pressure supply connected to said motor, electro-magnetic means in the connection for controlling the supply and exhaust of fluid pressure to the motor, a fluid pressure actuated locking means for locking the door in closed position, an electro-magnet valve connected to said locking means and said fluid pressure supply source for supplying fluid pressure to the locking means and for opening it to exhaust, circuits for said electro-magnet valves, and mechanically interlocked switches in said circuits arranged so that the circuits of the electro-magnet valve for the lock must be closed before the electro-magnet valve for the motor may be actuated so that the door is unlocked before it can be opened.

23. In a door locking and actuating system for doors comprising a plurality of cars, the combination comprising a plurality of cars, each having a plurality of doors thereon, means for operating the doors, means for locking the doors, control means on each car connected to the means for operating the doors and locking the doors on that car, said connections extending throughout the train, and means on each car at each end for arranging said connections to divide the train with respect to door operation and locking into a plurality of units comprising a plurality of cars, said control means including interlocked actuable members arranged so that the doors must be unlocked before they can be opened.

24. A combination of the type described comprising a fluid pressure actuated motive device, a movable door connected thereto, locking means for said door, means for actuating the locking means to non-locking position, retaining means mounted in the path of movement of the door for holding the locking means in non-locking position, mechanically interlocked control devices arranged so that the locking means must be actuated before the motive device can be energized, said retaining means being engaged by the door just as it closes to release the locking means to locking position, and means for actuating the interlocked control devices to a position to energize the motive device for door closing operation.

25. In a door locking and actuating system, the combination comprising a movable door, a motive device for moving the door, a locking device for locking the door in closed position, independent control devices for controlling the motive device and the locking device, mechanically interconnected manually actuable elements for operating the control device for the motive device and the control device for the locking device in sequence, and a single manually actuable means for returning the control device for the motive device and the control device for the locking device from actuated position to close the door and for resetting the mechanically interconnected manually actuable elements.

In testimony whereof I have hereunto set my hand on this 1st day of August A. D., 1930.

PARIS R. FORMAN.